US012783428B2

(12) United States Patent
Khaund et al.

(10) Patent No.: US 12,783,428 B2
(45) Date of Patent: Nov. 3, 2026

(54) CACHE SERVICE FOR PROVIDING ACCESS TO SECRETS IN CONTAINERIZED CLOUD-COMPUTING ENVIRONMENT

(71) Applicant: Microsoft Technology Licensing, LLC, Redmond, WA (US)

(72) Inventors: Bhaskardeep Khaund, Bothell, WA (US); Bo Wu, Albuquerque, WA (US); Andrey A. Lukyanov, Redmond, WA (US); Nicolae Voicu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/983,161

(22) Filed: Dec. 16, 2024

(65) Prior Publication Data

US 2025/0117339 A1 Apr. 10, 2025

Related U.S. Application Data

(63) Continuation of application No. 18/276,427, filed as application No. PCT/US2022/015659 on Feb. 8, 2022, now Pat. No. 12,210,464.

(30) Foreign Application Priority Data

Feb. 8, 2021 (NL) ..................................... 2027514

(51) Int. Cl.
*G06F 12/128* (2016.01)

(52) U.S. Cl.
CPC .................................. *G06F 12/128* (2013.01)

(58) Field of Classification Search
CPC ................. G06F 12/128; G06F 12/084; G06F 12/0806; G06F 12/1458; G06F 21/44;
(Continued)

(56) References Cited

U.S. PATENT DOCUMENTS

| | | | | |
|---|---|---|---|---|
| 9,684,594 B2 * | 6/2017 | Vekiarides | .......... | G06F 12/0897 |
| 12,210,464 B2 * | 1/2025 | Khaund | .............. | H04L 63/0281 |
| 2019/0288995 A1 * | 9/2019 | Bose | ....................... | H04L 63/20 |

OTHER PUBLICATIONS

Communication under Rule 71(3) EPC Received for EP Application No. 22704846.9, mailed on Mar. 9, 2026, 9 pages.

(Continued)

*Primary Examiner* — Than Nguyen
(74) *Attorney, Agent, or Firm* — Ray Quinney & Nebeker P.C.; Paul N. Taylor

(57) ABSTRACT

A cache service provides applications in a containerized, multi-tenant cloud-computing system low-latency access to secrets. The cache service may operate as a cluster-level service or a sidecar service. The cache service may store copies of secrets (which are located in one or more absolute stores) in a cache storage. The cache service and the cache storage may be closer to the applications than the one or more absolute stores are to the applications. The cache service may aggregate secrets associated with multiple entities in a single cache storage. The cache service may support isolation between secrets such that secrets of a first entity are isolated from secrets of a second entity. The cache service may enforce granulated access controls such that it can apply different access controls to secrets of a first entity than to secrets of a second entity.

21 Claims, 8 Drawing Sheets

(58) Field of Classification Search
CPC ................. G06F 21/79; H04L 63/0281; H04L 63/102; H04L 63/062; H04L 67/289; H04L 67/568
USPC .......................................................... 711/122
See application file for complete search history.

(56) References Cited

OTHER PUBLICATIONS

First Office Action received for Chinese Application No. 202280013699.8, mailed on Apr. 22, 2026, 06 Pages (English Translation Provided).
Decision to grant received for European Application No. 22704846.9, mailed on Jul. 9, 2026, 03 Pages.

* cited by examiner

CACHE SERVICE FOR PROVIDING ACCESS TO SECRETS IN CONTAINERIZED CLOUD-COMPUTING ENVIRONMENT

CROSS-REFERENCE TO RELATED APPLICATIONS

This application is a continuation of U.S. patent application Ser. No. 18/276,427, filed Aug. 8, 2023, which is a U.S. National Stage Entry of PCT Application No. PCT/US2022/015659, filed Feb. 8, 2022, which claims priority to Netherlands Application No. 2027514 filed on Feb. 8, 2021, the entirety of which is incorporated herein by reference.

BACKGROUND

A cloud-computing system may be a collection of computing devices or resources that provide customers with access to computing services or to physical computing resources over the Internet. The cloud-computing system may include a number of data centers located in different geographic locations. Each data center may include multiple clusters, and each cluster may include multiple servers. The server may include multiple containers. Each container may host an instance of an application for a tenant. In this way, a single server may provide services to multiple customers.

An application running in a container may need to access secrets in order to operate. The secrets may be sensitive data such as keys, credentials, configuration files, tokens, passwords, or certificates. Access to the secrets may be restricted based on access controls. The access controls may allow only authorized applications to access the secrets. The cloud-computing system may store the secrets in one or more master stores within the cloud-computing system. The one or more master stores may enforce the access controls to restrict access to the secrets. The one or more master stores may be located far from a requesting application.

SUMMARY

A cache service provides low latency, high throughput access to secrets while maintaining isolation and granulated access controls among secrets in a multi-tenant environment. The cache service acts as a proxy service that receives requests for secrets, validates and authenticates the requests, and provides access to the secrets. The cache service stores copies of secrets that are stored in one or more master stores in a cache storage that is closer to requesting applications than the one or more master stores are to the requesting applications. Similarly, the cache service is located closer to the requesting applications than the one or more master stores are to the requesting applications.

The cache service receives a request for a specific secret from a requesting application. The cache service validates and authenticates the request based on applicable access controls to determine whether the requesting application is authorized to access the specific secret. If the requesting application is authorized to access the specific secret, the cache service retrieves a copy of the specific secret from cache storage and provides the specific secret to the requesting application. Because the cache service and the cache storage are closer to the requesting application than an absolute store containing the specific secret is to the requesting application, the cache service reduces latency for requesting secrets.

In one embodiment, the cache service operates as a cluster-level service. In this embodiment, a cache service operates on a cluster and receives requests for secrets from applications operating on the cluster. The cache service may be horizontally scaled based on traffic. In another embodiment, the cache service operates as a sidecar service. Each application pod or container may include a cache service to receive requests from an application operating in the application pod or container. Operating the cache service as a cluster-level service provides better manageability compared to operating the cache service as a sidecar service. Operating the cache service in a sidecar model provides stronger security and isolation among secrets as compared to operating the cache service as a cluster-level service.

A cache service provides strong authentication and authorization enforcement. The cache service includes access controls that restrict access to secrets. The cache service uses the access controls to determine whether an application is authorized to access a specific secret. In one embodiment, the cache service includes different access controls for different individual secrets. For example, a cache service includes first access controls for a first secret and second access controls different from the first access controls for a second secret. The first access controls authorize a first entity to access the first secret while the second access controls do not authorize the first entity to access the second secret. As a result, the cache service authorizes the first entity to access the first secret under the first access controls but prohibits the first entity from accessing the second secret under the second access controls. In this way, the cache service provides applications associated with multiple different entities low-latency access to secrets while protecting secrets of one entity from unauthorized access by other entities.

In one embodiment, the access controls that the cache service enforces with respect to a specific secret are identical to access controls that a master store containing the specific secret enforces. In this way, the cache service reduces latency for secrets without compromising security and access control restrictions enforced by the master store.

In one embodiment, a cache service aggregates secrets from multiple master stores and provides isolation among the secrets. Consider a cluster-level cache service operating on a cluster of a cloud-computing system. Multiple applications associated with different entities are running on the cluster. The multiple applications on the cluster utilize multiple master stores to access secrets. The cache service provides the multiple applications on the cluster access to copies of secrets that are stored on the multiple master stores. In doing so, the cache service stores the copies of the secrets such that secrets of a first entity are logically or physically isolated from secrets of a second entity and such that the cache service can apply different access controls to secrets of the first entity than to secrets of the second entity. In this way, the cache service provides low-latency, high-throughput access to secrets to applications on a cluster in a multi-tenant environment while maintaining isolation and access protection among secrets of multiple tenants.

The cache service stores copies of secrets (which may come from multiple absolute stores and be associated with multiple entities) in a cache storage. In one embodiment, the cache storage is in-memory storage. In another embodiment, the cache storage is in-cluster storage. In another embodiment, the cache storage is off-cluster storage.

A cache service as described in this disclosure reduces latency for providing secrets (at least because the cache service and the cache storage are closer to requesting applications than master stores containing the secrets), reduces the load placed on master stores (at least because the cache service operates either as a cluster-level service or a sidecar service rather than an absolute store serving multiple clusters), provides for faster scaling in response to demand for secrets (at least because the cache service is horizontally scalable as a cluster-level service or scales up with an application as a sidecar service), and better system reliability (for example, containers can still scale up by obtaining secrets from the cache service when a master store goes down). The cache service provides these benefits while maintaining isolation among secrets of multiple entities in a multi-tenant environment and strong and granulated authentication and authorization protections for individual secrets of multiple entities.

In accordance with one aspect of the present disclosure, a cloud-computing system is disclosed. The cloud-computing system includes a first absolute store containing first secrets associated with a first service. The first absolute store enforces a first set of access controls on the first secrets. The first set of access controls authorize the first service to access the first secrets. The cloud-computing system also includes a second absolute store containing second secrets associated with a second service. The second absolute store enforces a second set of access controls on the second secrets. The second absolute store is separate from the first absolute store. The second set of access controls authorize the second service to access the second secrets but do not authorize the first service to access the second secrets. The cloud-computing system also includes a cache storage containing copies of the first secrets and the second secrets. The cloud-computing system also includes a first cluster of two or more servers. The first cluster includes a first container including the first service. The first container is an isolated environment in the first cluster for running the first service. The first cluster also includes a second container including the second service. The second container is an isolated environment in the first cluster for running the second service. The first cluster also includes a cache service. The cache service includes instructions stored in memory that, when executed by one or more processors, cause the cache service to receive, from the first service, a first call for the first secrets. The instructions, when executed by one or more processors, also cause the cache service to receive, from the second service, a second call for the second secrets. The instructions, when executed by one or more processors, also cause the cache service to authenticate the first call based on the first set of access controls and authenticate the second call based on the second set of access controls. The instructions, when executed by one or more processors, also cause the cache service to retrieve, in response to authenticating the first call, the first secrets from the cache storage. The first container is more proximate to the cache storage than to the first absolute store. The instructions, when executed by one or more processors, also cause the cache service to retrieve, in response to authenticating the second call, the second secrets from the cache storage. The second container is more proximate to the cache storage than to the second absolute store.

The first cluster may include the cache storage.

The first service may be associated with a first tenant and the second service may be associated with a second tenant different from the first tenant.

The first service and the second service may be associated with a same tenant.

The cache service may further include a cache expiration policy. The cache expiration policy may determine when entries in the cache storage expire and wherein the cache expiration policy is based on the first set of access controls and the second set of access controls.

The first cluster further may include a third container that includes a second instance of the first service. The instructions stored in memory, when executed by the one or more processors, may further cause the cache service to receive, from the second instance of the first service, a third call for the first secrets. The instructions stored in memory, when executed by the one or more processors, may further cause the cache service to authenticate the third call based on the first set of access controls. The instructions stored in memory, when executed by the one or more processors, may further cause the cache service to retrieve, in response to authenticating the third call, the first secrets from the cache storage.

The cloud-computing system may further include a second instance of the cache service and the cache service and the second instance of the cache service engage in peer-to-peer communication.

The system may further include a second cache storage containing copies of the first secrets and a second cluster. The second cluster may include a fourth container including a third instance of the first service and a second cache service. The second cache service may include instructions stored in memory that, when executed by one or more processors, cause the cache service to receive, from the third instance of the first service, a fourth call for the first secrets. The instructions, when executed by one or more processors, may also cause the cache service to authenticate the fourth call based on the first set of access controls and retrieve, in response to authenticating the fourth call, the first secrets from the second cache storage. The fourth container may be more proximate to the second cache storage than to the first absolute store.

The instructions stored in the memory that, when executed by the one or more processors, may further cause the cache service to receive, from the second service, a fifth call for the first secrets. The instructions, when executed by the one or more processors, may further cause the cache service to determine, based on the fifth call and the first set of access controls, that the second service is not authorized to access the first secrets. The instructions, when executed by the one or more processors, may further cause the cache service to reject the fifth call for the first secrets.

In accordance with another aspect of the present disclosure, a cloud-computing system is disclosed. The cloud-computing system includes a first absolute store containing first secrets. The first absolute store enforces a first set of access controls on the first secrets and the first set of access controls authorize a first service to access the first secrets. The cloud-computing system includes a first cluster of two or more nodes having a first geographic location. The first cluster includes a first cache storage containing copies of the first secrets and a first container. The first container includes a first instance of the first service and a first cache service. The first cache service includes first instructions stored in memory that, when executed by one or more processors, cause the first cache service to receive, from the first instance of the first service, a first call for the first secrets. The first instructions, when executed by one or more processors, also cause the first cache service to authenticate the first call based on the first set of access controls. The first instructions, when executed by one or more processors, also cause the first cache service to retrieve, in response to authenticating the first call, the first secrets from the first cache storage. The first container is more proximate to the first cache storage than to the first absolute store. The cloud-computing system also includes a second cluster of two or more nodes having a second geographic location different from the first geographic location. The second cluster includes a second cache storage containing copies of the first secrets and a second container that includes a second instance of the first service and a second cache service. The second cache service includes second instructions stored in memory that, when executed by one or more processors, cause the second cache service to receive, from the second instance of the first service, a second call for the first secrets. The second instructions, when executed by one or more processors, also cause the second cache service to authenticate the second call based on the first set of access controls. The second instructions, when executed by one or more processors, also cause the second cache service to retrieve, in response to authenticating the second call, the first secrets from the second cache storage. The second container is more proximate to the second cache storage than to the first absolute store.

The system may further include a second absolute store containing second secrets. The second absolute store enforces a second set of access controls on the second secrets. The second absolute store may be separate from the first absolute store. The second set of access controls may authorize a second service to access the second secrets but do not authorize the first service to access the second secrets. The second cache storage may further include copies of the second secrets. The second cluster may further include a third container. The third container may include a first instance of the second service and a third cache service. The third cache service may include third instructions stored in memory that, when executed by one or more processors, cause the third cache service to receive, from the first instance of the second service, a third call for the second secrets. The third instructions, when executed by one or more processors, may also cause the third cache service to authenticate the third call based on the second set of access controls and retrieve, in response to authenticating the third call, the second secrets from the second cache storage.

The first secrets may include one or more passwords.

In accordance with another aspect of the present disclosure, a computer-readable medium is disclosed that includes instructions that are executable by one or more processors to cause a computing system to store copies of first secrets in a cache storage. The cache storage is part of a cloud-computing system. The first secrets are also stored at a first location different from the cache storage. A first set of access controls authorizes a first entity to access the first secrets but not a second entity. The instructions are also executable by one or more processors to cause a computing system to store copies of second secrets in the cache storage. The second secrets are different from the first secrets. The second secrets are also stored in a second location different from the cache storage, and a second set of access controls authorizes the second entity to access the second secrets but not the first entity. The instructions are also executable by one or more processors to cause a computing system to receive, within a first cluster of the cloud-computing system, a first call for the first secrets from a first service associated with the first entity. The first service is running in a first container in the first cluster and the first container is closer to the cache storage than to the first location. The instructions are also executable by one or more processors to cause a computing system to determine, based on the first call and the first set of access controls, that the first service is authorized to access the first secrets. The instructions are also executable by one or more processors to cause a computing system to receive, within the first cluster, a second call for the second secrets from a second service associated with the second entity. The second service is running in a second container in the first cluster and the second container is closer to the cache storage than to the second location. The instructions are also executable by one or more processors to cause a computing system to determine, based on the second call and the second set of access controls, that the second service is authorized to access the second secrets. The instructions are also executable by one or more processors to cause a computing system to retrieve, based on determining that the first service is authorized to access the first secrets, the first secrets from the cache storage. The instructions are also executable by one or more processors to cause a computing system to retrieve, based on determining that the second service is authorized to access the second secrets, the second secrets from the cache storage. The instructions are also executable by one or more processors to cause a computing system to provide the first secrets to the first service. The instructions are also executable by one or more processors to cause a computing system to provide the second secrets to the second service.

The computer-readable medium may further include instructions that are executable by the one or more processors to cause the computing system to receive, from a second instance of the first service, a third call for the first secrets. The second instance of the first service may be running in a third container in the first cluster. The computer-readable medium may further include instructions that are executable by the one or more processors to cause the computing system to determine, based on the third call and the first set of access controls, that the second instance of the first service is authorized to access the first secrets. The computer-readable medium may further include instructions that are executable by the one or more processors to cause the computing system to provide the first secrets to the second instance of the first service.

The computer-readable medium may further include instructions that are executable by the one or more processors to cause the computing system to receive, from the second service, a fourth call for the first secrets. The computer-readable medium may further include instructions that are executable by the one or more processors to cause the computing system to determine, based on the fourth call and the first set of access controls, that the second service is not authorized to access the first secrets. The computer-readable medium may further include instructions that are executable by the one or more processors to cause the computing system to reject the fourth call.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
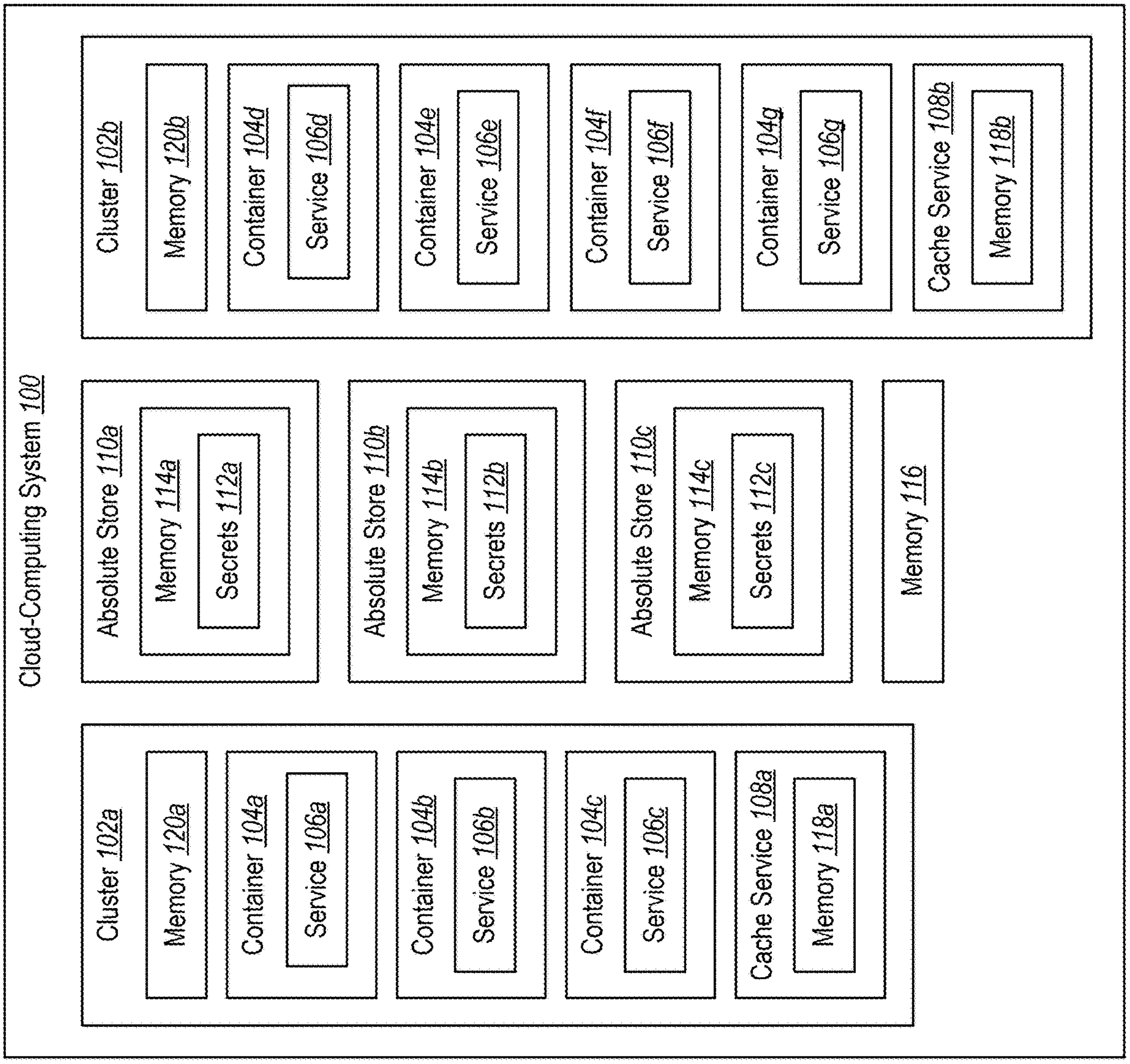
FIG. 1A illustrates a cloud-computing system in which a cache service for providing access to secrets operates as a cluster-level service.

This disclosure concerns a cache service for providing applications in a containerized and multi-tenant environment of a cloud-computing system secure and fast access to secrets while maintaining granulated access controls and isolation among secrets of multiple entities.

A cloud-computing system is a collection of computing devices or resources that can be accessed remotely. The cloud-computing system provides tenants with access to computing services or to physical computing resources over the Internet. The cloud-computing system includes a number of data centers located in different geographic locations. Each data center includes multiple clusters, and each cluster includes multiple servers (which may be referred to as nodes). A server is a physical computer system. The server includes multiple containers. Each container may host an instance of an application for a tenant. In this way, a single server and a single cluster provide services to multiple tenants.

An application running in a container needs to access secrets in order to initiate, operate, process workloads, and provide services. The secrets are sensitive data. The secrets are non-public data. Examples of secrets include keys, credentials, configuration files, tokens, passwords, or certificates. As a result, unauthorized access to secrets could allow a bad actor to gain unrestricted access to even more information that is otherwise protected. Therefore, it is important that the cloud-computing system allow only authorized entities to access secrets. In other words, it is important that a cloud-computing system providing services to many different entities protect secrets of one entity from being access by another entity. As a result, access to the secrets is restricted based on access controls. The access controls allow only authorized entities to access the secrets. For example, access controls may restrict access to the secrets to one or more specific tenants, one or more specific identities within a tenant, one or more specific services of a tenant, or one or more specific services of an identity within a tenant.

The cloud-computing system stores the secrets in one or more master stores (which may be referred to as absolute stores) within the cloud-computing system. The one or more master stores enforce the access controls such that only authorized entities can access the secrets. Each master store may be physically or logically separate from other master stores. Each master store may have access to only those secrets stored within and managed by it.

Each application may have an associated master store that stores and manages secrets needed by the application. An application is a particular software program configured for a particular entity. The same software program may be deployed as a first application configured for a first entity and as a second application configured differently for a second entity. Multiple copies (instances) of the same application may be deployed in a cloud-computing system. To obtain access to a secret the application (and all instances of the application) sends a request to a master store. The request identifies one or more requested secrets and includes an artifact authenticating the request. The master store determines whether the application is authorized to access the one or more requested secrets based on the artifact and the access controls applicable to the one or more requested secrets. If the master store determines that the application is authorized to access the one or more requested secrets, then the master store provides the one or more requested secrets to the application.

Using a master store to provide an application access to secrets presents challenges. First, the master store may be geographically distant from the application. For example, a cloud-computing system may have computing resources (such as data centers) at various locations throughout the world. As a result, a master store may be located in a geographic location that is far away from the application. This distance results in a delay between when the application sends a request for a secret and when the application receives a response from the master store. Second, the master store may become overwhelmed with requests. When an application is running in a containerized environment, the application may scale up and down with high speed. In other words, the cloud-computing system may rapidly increase or decrease the number of instances of the application, which may be running on multiple clusters across the cloud-computing system. For example, as demand for the application's services increases, the cloud-computing system replicates the application, creating multiple instances of the application. These multiple instances of the application may be spread across multiple clusters. Each of these instances of the application may send requests for secrets to a same master store. Because the number of instances of the application may increase quickly, the number of requests for secrets sent by instances of the application may exceed the master store's capacity.

A cache service provides low latency, high throughput access to secrets while maintaining isolation and granulated access controls among secrets in a multi-tenant environment. The cache service acts as a proxy service that receives requests for secrets, validates and authenticates the requests, and provides access to the secrets. The cache service stores copies of secrets that are stored in one or more master stores in a cache storage that is closer to requesting applications than the one or more master stores are to the requesting applications. Similarly, the cache service is located closer to the requesting applications than the one or more master stores are to the requesting applications.

The cache service receives a request from a container with a requesting application. The request may include an artifact and identify a specific requested secret. The cache service validates the artifact and authenticates the request based on applicable access controls to determine whether the requesting application is authorized to access the specific requested secret. If the requesting application is authorized to access the specific requested secret, the cache service retrieves a copy of the specific requested secret from cache storage and provides the specific requested secret to the requesting application. Because the cache service and the cache storage are closer to the requesting application than the absolute store is to the requesting application, the cache service reduces latency for requesting secrets.

The cache service may operate as a cluster-level service or as a sidecar service. In either case, the cache service provides higher throughput access to secrets than an absolute store.

When operating as a cluster-level service, each cluster in a cloud-computing system may have a cache service. The cache service operating on a cluster receives requests from applications operating on the cluster. The cache service is horizontally scaled based on traffic. For example, as a rate of requests on the cache service increases, the cache service may be scaled to multiple instances. Each instance may operate in a separate container on the cluster. The multiple instances of the cache service may engage in peer-to-peer communication to ensure consistency in responding to requests for secrets. Operating the cache service as a cluster-level service provides better manageability compared to operating the cache service as a sidecar service.

When operating as a sidecar service, each application pod or container may include a cache service to receive requests from an application operating in the application pod or container. As demand for the application increases and the cloud-computing system generates additional pods to house additional instances of the application, each additional pod may include an additional instance of the cache service. Operating the cache service in a sidecar model provides stronger security and isolation among secrets. For example, a cache service operating within an application pod may have access to only those secrets associated with an application running in the application pod or to only those secrets that the application running in the application pod is authorized to access.

A cache service as described in this disclosure provides strong authentication and authorization enforcement. The cache service includes access controls that restrict access to secrets. The access controls may limit access to secrets to only certain entities. For example, the access controls may allow access to only one or more specific tenants, one or more specific identities within a tenant, or one or more specific applications associated with a specific identity or tenant. The access controls may be role-based access controls. The cache service enforces the access controls.

The cache service includes different access controls for different individual secrets. For example, a cache service may include first access controls for a first secret and second access controls different from the first access controls for a second secret. As a result, a first entity may be permitted to access the first secret under the first access controls but may be prohibited from accessing the second secret under the second access controls. In this way, the cache service can service applications associated with multiple different entities and protect secrets of a first entity from being accessed by a second entity. If desired, the cache service can also protect secrets of a first application from secrets of a second application, even where the first application and the second application are associated with the same tenant or identity.

The cache service uses the access controls to determine whether an application is authorized to access a specific secret. The access controls that the cache service enforces with respect to the specific secret may be identical to access controls that a master store containing the specific secret enforces. For example, assume a first master store contains a first secret and that, based on a first set of access controls, a first application is authorized to access the first secret but a second application is not authorized to access the first secret. Assume a cache service receives a first request from the first application for the first secret. The cache service may determine, based on the first request and the first set of access controls, that the first application is authorized to access the first secret. As a result, the cache service may provide the first secret to the first application. Assume the cache service receives a second request from the second application for the first secret. The cache service may determine, based on the second request and the first set of access controls, that the second application is not authorized to access the first secret. As a result, the cache service may reject the second request.

A cache service may aggregate secrets from multiple master stores and provide isolation among the secrets. Consider a cluster-level cache service operating on a cluster of a cloud-computing system. Multiple applications associated with different entities may be running on the cluster. The multiple applications on the cluster may include multiple instances of a single application, different applications associated with a single tenant, applications associated with multiple different tenants, and applications associated with different identities within a single tenant. The multiple applications on the cluster may utilize multiple master stores to access secrets. The cache service may provide access to the multiple applications on the cluster to copies of secrets that are stored on the multiple master stores.

The cache service stores the secrets from the multiple master stores in such a way that they are logically or physically isolated from each other. In this way, the cache service may isolate secrets of a first entity from secrets of a second entity and protect secrets of the first entity from being accessed by the second entity. Through isolation the cache service may also provide access to individual secrets (and even individual versions of individual secrets) and enforce access controls applicable to individual secrets (and individual versions of individual secrets).

For example, assume a first master store includes a first secret of a first application of a first tenant and a second master store includes a second secret of a second application of a second tenant different from the first tenant. Assume the first application, the second application, and a cache service are running on a cluster. The cache service receives requests from both the first application and the second application. The cache service may allow the first application to access the first secret but deny the first application access to the second secret. Similarly, the cache service may provide the second application access to the second secret but deny the second application access to the first secret.

As another example, assume a first master store includes a first secret of a first identity of a tenant and a second master store includes a second secret of a second identity of the tenant (the second identity being different from the first identity). Assume a first set of access controls provides the first identity access to the first secret but does not provide the second identity access to the first secret. Similarly, assume a second set of access controls provides the second identity access to the second secret but does not provide the first identity access to the second secret. Assume a first application of the first identity, a second application of the second identity, and a cache service are running on a cluster. The cache service May provide the first application access to the first secret but deny the first application access to the second secret. Similarly, the cache service may provide the second application access to the second secret but deny the second application access to the first secret.

As another example, assume a first master store includes a first secret of a first application of a tenant and a second master store includes a second secret of a second application of the tenant (the second application being different from the first application). Assume a first set of access controls provides the first application access to the first secret but does not provide the second application access to the first secret. Similarly, assume a second set of access controls provides the second application access to the second secret but does not provide the first application access to the second secret. Assume the first application, the second application, and a cache service are running on a cluster. The cache service may provide the first application access to the first secret but deny the first application access to the second secret. Similarly, the cache service may provide the second application access to the second secret but deny the second application access to the first secret.

The cache service stores copies of secrets (which may come from multiple absolute stores and be associated with multiple entities) in a cache storage. The cache storage is in-memory storage, in-cluster storage, or off-cluster storage. For in-memory storage, each cache service instance stores copies of secrets in volatile memory of the cache service's container. During start-up the instance of the cache service may "warm-up" the memory from one or more master stores or from a peer cache storage. For in-cluster storage, the cache storage is a common, in-cluster storage. For example, the cache storage may be an etcd database of the cluster as a CRD (custom resource definition) or in an instance of Redis cache. In this case, all instances of the cache service share the cache storage and perform warm-up on and fetch secrets from this common, in-cluster cache storage. For off-cluster storage, the cache storage is outside the cluster and inside the cloud-computing system. The warm-up operation may be done from this location, and cache services operating in multiple clusters in a fleet may share the cache storage.

A cache service may use two or more cache storages. For example, the cache service may use in-memory storage as an L1 cache layer and an in-cluster or off-cluster storage as an L2 cache layer. The L1 cache layer may provide a hot cache for extremely fast access, and the L2 may be used as warm-up or disaster recovery.

A cache service as described in this disclosure reduces latency for providing secrets, reduces the load placed on master stores, provides for faster scaling in response to demand for secrets, and better system reliability (for example, containers can still scale up by obtaining secrets from the cache service when a master store goes down). The cache service provides these benefits while maintaining isolation among secrets of multiple entities in a multi-tenant environment and strong and granulated authentication and authorization protections for individual secrets of multiple entities.

As used in the present disclosure, a "container" refers to a virtual service or layer on a server node of a cloud-computing system that provides access to computing resources (such as a storage space) and/or to a software application hosted by the cloud-computing system. A container provides an isolated environment for running an application on a server of a cloud-computing system. A container may include configuration files and libraries and dependencies required for the application to run. An application or service, its dependencies, and its configuration may be packaged together as a container image. A container offers a logical packaging mechanism in which applications can be abstracted from an environment in which they actually run. This decoupling allows container-based applications to be deployed easily and consistently, regardless of whether the target environment. A container may provide services to any number of containerized applications on a cloud-computing system.

A "service" may be software functionality or a set of software functionalities (such as the retrieval of specified information or the execution of a set of operations). A service may be configured for different purposes. A service may include policies that should control its usage (such as based on an identity of an entity requesting the service, for example).

A "virtual machine" refers to an emulation of a computer system on a server node that provides functionality of one or more applications on the cloud computing system. Virtual machines may provide functionality needed to execute one or more operating systems. In addition, virtual machines may make use of hypervisors on processors of server devices that support virtual replication of hardware. While one or more specific examples and implementations described herein may relate specifically to virtual machines, features and functionality described in connection with utilizing resources on a server node may similarly apply to other types of computing containers.

FIG. 1 illustrates an example cloud-computing system 100 in which a cache service operates as a cluster-level service. The cloud-computing system 100 includes cluster 102*a*, cluster 102*b*, absolute store 110*a*, absolute store 110*b*, absolute store 110*c*, and memory 116.

The cloud-computing system 100 includes a large amount of physical computing resources, including processing cores, storage space, and memory. The physical computing resources are organized according to a particular structure. For example, physical computing resources may be organized into nodes (also referred to as servers or blades). A group of nodes may form a rack. A group of racks may form a cluster. A data center may house multiple clusters. And a cloud-computing system may include multiple data centers located in different regions of the world.

These physical computing resources are used to host containers. The containers host applications. The applications perform workloads on behalf of one or more tenants. A tenant may be a customer of the cloud-computing system. For example, a tenant may pay a fee for a right to use resources of the cloud-computing system 100. A tenant may be a group of users (or identities) who share a common access with specific privileges. Users within a tenant may, however, have different access privileges with respect to secrets. The cloud-computing system 100 hosts applications associated with multiple different tenants. Each of the multiple different tenants may have multiple different identities. Each application in a container may be dedicated to a single tenant or to a single identity of a tenant.

The cloud-computing system 100 scales applications up and down based on demand. For example, if demand for a first application of a first tenant increases, the cloud-computing system 100 creates one or more additional containers to host one or more additional instances of the first application. Each of the one or more additional instances of the first application may be associated with the first tenant.

Applications hosted on the cloud-computing system 100 need access to secrets. Secrets include sensitive data such as API keys, SSH keys, private encryption keys, credentials, configuration files, tokens, passwords, or certificates. The cloud-computing system 100 restricts access to secrets to protect secrets of one tenant or one identity from other tenants and identities. The cloud-computing system 100 enforces access controls on secrets to ensure that only those tenants, identities, and applications authorized to access certain secrets are able to access the certain secrets.

Secrets include one or more individual secrets and one or more versions of the one or more individual secrets. The secrets may be associated with an entity, such as an application, service, user, or tenant. The secrets may contain information specific to the entity with which the secrets are associated.

The cloud-computing system 100 includes access controls that restrict access to the secrets. The access controls regulate who can view or use the secrets. For example, assume a first secret is associated with a first application of a first tenant. Access controls may limit access to the first secret to the first application of the first tenant. Alternatively, the access controls may limit access to the first secret to the first tenant, including other applications of the first tenant. The access controls may include identification, validation, authentication, and authorization protocols. The access controls may enforce distinct access restrictions for individual secrets or individual versions of individual secrets contained in the secrets. The access controls may be role-based access control (RBAC).

The cloud-computing system 100 stores secrets on absolute stores, such as the absolute stores 110*a*, 110*b*, 110*c*. The absolute stores 110*a*, 110*b*, 110*c* include systems or devices capable of storing and managing electronic information. The absolute stores 110*a*, 110*b*, 110*c* include or have access to repositories for persistently storing and managing collections of electronic data. Each of the absolute stores 110*a*, 110*b*, 110*c* may include or have access to a defined set of physical computing resources. Each of the absolute stores 110*a*, 110*b*, 110*c* may run inside a container. Each of the absolute stores 110*a*, 110*b*, 110*c* has a geographic location. Each of the absolute stores 110*a*, 110*b*, 110*c* may have a different geographic location. For example, the absolute store 110*a* may be located in North America while the absolute store 110*b* may be located in Australia.

Each of the absolute stores 110*a*, 110*b*, 110*c* is a separate system or devices. Each of the absolute stores 110*a*, 110*b*, 110*c* may be physically separate systems or devices. For example, each of the absolute stores 110*a*, 110*b*, 110*c* may include or have access to non-overlapping hardware. Each of the absolute stores 110*a*, 110*b*, 110*c* may be logically separate systems or devices. For example, each of the absolute stores 110*a*, 110*b*, 110*c* may be independently managed or run inside separate containers or virtual machines. Each of the absolute stores 110*a*, 110*b*, 110*c* has access to only data stored inside it and does not have access to data stored in a different absolute store. Each of the absolute stores 110*a*, 110*b*, 110 may have a separate management system. A management system may include one or more programs that control organization, storage, management, and retrieval of data stored on a data store. Each of the absolute stores 110*a*, 110*b*, 110*c* provides services to a single application (although it may provide services to multiple instances of the single application).

The absolute store 110*a* includes memory 114*a*. The memory 114*a* stores electronic data. The memory 114*a* may be addressable semiconductor memory. The memory 114*a* may include volatile memory or non-volatile memory. The memory 114*a* stores secrets 112*a*. The absolute store 110*a* controls access to the memory 114*a* and the secrets 112*a*. The absolute store 110*a* controls access to the memory 114*a* and the secrets 112*a* based on access controls included in the absolute store 110*a*. The access controls limit access to the secrets 112*a*. For example, the access controls may limit access to the secrets 112*a* to certain entities. The secrets 112*a* are associated with a particular entity. For example, the secrets 112*a* may be associated with a particular entity, a particular identity, or a particular tenant.

The absolute store 110*b* includes memory 114*b*. The memory 114*b* includes secrets 112*b*. The secrets 112*b* are associated with an entity different from the entity associated with the secrets 112*a*. The absolute store 110*b* controls access to the memory 114*b* and the secrets 112*b*. The absolute store 110*b* controls access to the memory 114*b* and the secrets 112*b* based on access controls included in the absolute store 110*b*. The access controls applicable to the secrets 112*b* are different from the access controls applicable to the secrets 112*a*. In other words, the limits on access to the secrets 112*b* are different from the limits on access to the secrets 112*a*. For example, a request that may be granted based on the access controls applicable to the secrets 112*b* may be denied based on the access controls applicable to the secrets 112*a*. As another example, an entity authorized to access the secrets 112*b* under the access controls applicable to the secrets 112*b* may not be authorized to access the secrets 112*a* under the access controls applicable to the secrets 112*a*.

The absolute store 110*c* includes memory 114*c*. The memory 114*c* includes secrets 112*c*. The secrets 112*c* are associated with an entity different from the entity associated with the secrets 112*a* and the entity associated with the secrets 112*b*. The secrets 112*c* contains secrets specific to the entity with which the secrets 112*c* are associated. The absolute store 110*c* controls access to the memory 114*c* and the secrets 112*c*. The absolute store 110*c* controls access to the memory 114*c* and the secrets 112*c* based on access controls. The access controls applicable to the secrets 112*c* are different from the access controls applicable to the secrets 112*a* and from the access controls applicable to the secrets 112*b*.

The memory 114*a* may be physically distinct from the memory 114*b* and the memory 114*c*. The memory 114*b* may be physically distinct from the memory 114*a* and the memory 114*c*. In the alternative, the memory 114*a* may be logically distinct from the memory 114*b* and the memory 114*c*, and the memory 114*b* may be logically distinct from the memory 114*a* and the memory 114*c*. The absolute store 110*a* may not be able to access the memory 114*b* or the memory 114*c*, the absolute store 110*b* may not be able to access the memory 114*a* or the memory 114*c*, and the absolute store 110*c* may not be able to access the memory 114*a* or the memory 114*b*.

The cluster 102*a* is a network of computers. The cluster 102*a* may include one or more racks. Each of the one or more racks may include one or more servers. Each of the one or more servers includes computing resources such as processing cores, memory, storage resources, and networking resources. The cluster 102*a* has a geographic location. The geographic location of the cluster 102*a* may be different from the geographic locations of the absolute stores 110*a*, 110*b*, 110*c*. For example, the cluster 102*a* may be located in West Virginia, USA while the absolute store 110*b* may be located in Australia.

The cluster 102*a* includes multiple containers. For example, the cluster 102*a* includes container 104*a*, container 104*b*, and container 104*c*. The containers 104*a*, 104*b*, 104*c* are isolated, lightweight silos for running applications and services. The containers 104*a*, 104*b*, 104*c* are logically distinct from each other. The containers 104*a*, 104*b*, 104*c* may be built on top of one or more operating system kernels. The containers 104*a*, 104*b*, 104*c* may operate on one or more nodes in the cluster 102*a*.

The container 104*a* includes service 106*a*. The service 106*a* is any software service such as a workload or an application. The service 106*a* may be associated with a first tenant or a first user of the first tenant. The service 106*a* requires access to secrets to initiate and operate. For example, the secrets 112*a* may include passwords or other sensitive information required for the service 106*a* to initiate or operate.

When the service 106*a* needs secrets, the service 106*a* (or the container 104*a*) may send a call to an absolute store associated with the service 106*a*. For example, assume the absolute store 110*a* manages a specific secret that the service 106*a* needs to access. Assume that the specific secret that the service 106*a* needs to access is included in the secrets 112*a*. The service 106*a* may send a call to the absolute store 110*a* requesting access to the specific secret. The absolute store 110*a* may validate and authenticate the call and determine that, based on the access controls applicable to the specific secret requested by the service 106*a*, the service 106*a* is authorized to access the specific secret. In response to authenticating the call, the absolute store 110*a* may provide the specific secret to the service 106*a*. The absolute store 110*a* may have a location physically distant from the service 106*a*. As a result of the physical distance between the absolute store 110*a* and the service 106*a*, there may be a delay between when the service 106*a* requests access to the specific secret and when the service 106*a* receives the specific secret from the absolute store 110*a*.

The container 104*b* includes service 106*b*. The service 106*b* may be associated with a second tenant or a second identity of the first tenant. The second tenant may be different from the first tenant. The second identity may be different from the first identity. The service 106*b* requires access to secrets to initiate or operate. For example, the secrets 112*b* may include passwords or other sensitive information required for the service 106*b* to initiate or operate. When the service 106*b* needs secrets, the service 106*b* (or the container 104*b*) may send a call to an absolute store associated with the service 106*b*. For example, the absolute store 110*b* may be associated with the service 106*b* and manage secrets of the service 106*b*.

The container 104*c* includes service 106*c*. The service 106*c* may be associated with a third tenant or a third identity of the first tenant. The third tenant may be different from the first tenant and the second tenant. The third identity may be different from the first identity and the second identity. The service 106*c* may require access to secrets to initiate or operate. For example, the secrets 112*c* may include passwords or other sensitive information required for the service 106*c* to initiate or operate. When the service 106*c* needs secrets, the service 106*c* (or the container 104*c*) may send a call to an absolute store associated with the service 106*c*. For example, the absolute store 110*c* may be associated with the service 106*c* and manage secrets of the service 106*c*.

The cluster 102*b* includes container 104*d*, container 104*e*, container 104*f*, container 104*g*. The containers 104*d*, 104*e*, 104*f*, 104*g* operate on one or more nodes in the cluster 102*b*.

The container 104*d* includes service 106*d*. The service 106*d* may be associated with the first tenant or the first identity. The service 106*d* is a second instance of the service 106*a*. The service 106*d* may be a duplicate of the service 106*a* but in a separate container. The service 106*d* requires access to secrets to initiate or operate. For example, the secrets 112*a* may include passwords or other sensitive information required for the service 106*d* to initiate or operate. To access the secrets 112*a* the service 106*d* may send a call to the absolute store 110*a*.

The container 104*e* includes service 106*e*. The service 106*e* may be associated with the first tenant or the first identity. The service 106*e* is a third instance of the service 106*a*. The service 106*e* requires access to secrets to initiate or operate. For example, the secrets 112*a* may include passwords or other sensitive information required for the service 106*e* to initiate or operate. To access the secrets 112*a* the service 106*e* may send a call to the absolute store 110*a*.

The container 104*f* includes service 106*f*. The service 106*f* may be associated with the second tenant or the second identity. The service 106*f* is a second instance of the service 106*b*. The service 106*f* requires access to secrets to initiate or operate. For example, the secrets 112*b* may include passwords or other sensitive information required for the service 106*f* to initiate or operate. To access the secrets 112*b* the service 106*f* may send a call to the absolute store 110*b*.

The container 104*g* includes service 106*g*. The service 106*g* may be associated with the third tenant or the third identity. The service 106*g* is a second instance of the service 106*c*. The service 106*g* requires access to secrets to initiate or operate. For example, the secrets 112*c* may include passwords or other sensitive information required for the service 106*g* to initiate or operate. To access the secrets 112*c* the service 106*g* may send a call to the absolute store 110*c*.

In addition to the services 106*a*, 106*d*, 106*e*, the cloud-computing system 100 may include additional instances of the service 106*a*. For example, the cloud-computing system 100 may include hundreds of instances of the service 106*a*. The instances of the service 106*a* may be spread across the world. Each of the instances require access to the secrets 112*a*. As a result, each of the instances of the service 106*a* may send a call to the absolute store 110*a* each time it needs access to the secrets 112*a*. The volume of requests sent to the absolute store 110*a* may cause delays in the absolute store 110*a* providing requested secrets. The volume of requests may also exceed a capacity of the absolute store 110*a* and result in the absolute store 110*a* not responding to some requests.

To reduce latency associated with services receiving access to secrets and to increase throughput in providing access to secrets the cluster 102*a* includes cache service 108*a* and the cluster 102*b* includes cache service 108*b*.

The cache service 108*a* provides the services 106*a*, 106*b*, 106*c* access to secrets. The cache service 108*a* may reside in a service container separate from the containers 104*a*, 104*b*, 104*c*. The services 106*a*, 106*b*, 106*c* are closer to the cache service 108*a* than to the absolute stores 110*a*, 110*b*, 110*c*.

The cache service 108*a* has access to copies of secrets that the services 106*a*, 106*b*, 106*c* need to access. For example, the cache service 108*a* has access to copies of the secrets 112*a*, 112*b*, 112*c*. The services 106*a*, 106*b*, 106*c* are closer to the copies of the secrets 112*a*, 112*b*, 112*c* than to the absolute stores 110*a*, 110*b*, 110*c*. The cache service 108*a* stores copies of individual secrets or versions of individual secrets with logical or physical isolation. In this way, the cache service 108*a* provides and controls access to individual secrets or individual versions of individual secrets. The cache service 108*a* may apply different access controls to different individual secrets.

Copies of the secrets 112*a*, 112*b*, 112*c* may be stored in memory 118*a*. The memory 118*a* is within the service container in which the cache service 108*a* resides. The cache service 108*a* may access the memory 118*a* to retrieve copies of the secrets 112*a*, 112*b*, 112*c*. Copies of the secrets 112*a*, 112*b*, 112*c* may be stored in memory 120*a*. The memory 120*a* is memory in the cluster 102*a* but may be outside the service container in which the cache service 108*a* resides. The cache service 108*a* may access the memory 120*a* to retrieve copies of the secrets 112*a*, 112*b*, 112*c*. Copies of the secrets 112*a*, 112*b*, 112*c* may be stored in memory 116. The memory 116 is memory in the cloud-computing system 100 but outside the cluster 102*a*. The cluster 102*a* may be closer to the memory 116 than to the absolute stores 110*a*, 110*b*, 110*c*. The cache service 108*a* may access the memory 116 to retrieve copies of the secrets 112*a*, 112*b*, 112*c*.

Copies of the secrets 112*a*, 112*b*, 112*c* may be stored in two or more locations among the memory 118*a*, the memory 120*a*, and the memory 116. For example, the memory 118*a* may serve as a layer one cache layer (a hot cache that would provide fast access) and the memory 120*a* or the memory 116 may serve as a layer two cache layer (for warm-up or disaster recovery).

The cache service 108*a* applies access controls to the copies of the secrets 112*a*, 112*b*, 112*c*. The cache service 108*a* may apply access controls to copies of individual secrets and copies of individual versions of individual secrets. The cache service 108*a* may apply access controls to the copies of the secrets 112*a* identical to the access controls that the absolute store 110*a* applies to the secrets 112*a*. The cache service 108*a* may apply access controls to the copies of the secrets 112*b* identical to the access controls that the absolute store 110*b* applies to the secrets 112*b*. The cache service 108*a* may apply access controls to the copies of the secrets 112*c* identical to the access controls that the absolute store 110*c* applies to the secrets 112*c*.

The cache service 108*a* receives requests for access to secrets from containers in the cluster 102*a* where the cache service 108*a* resides. For example, the cache service 108*a* may receive requests to access the secrets 112*a*, 112*b*, 112*c* from the containers 104*a*, 104*b*, 104*c*. A request may identify one or more specific secrets and include an artifact for authentication. The artifact may include information about a requesting service. The cache service 108*a* may determine whether to grant the request based on the one or more specific secrets identified in the request, the artifact included in the request, and a set of access controls applicable to the one or more specific secrets. If the cache service 108*a* grants the request, the cache service 108*a* provides the requesting service the one or more specific secrets. The cache service 108*a* may retrieve the one or more specific secrets from the memory 118*a*, the memory 120*a*, or the memory 116.

The access controls of the cache service 108*a* protect secrets of a first entity from being accessed by a second entity. For example, assume access controls applicable to the secrets 112*a* allow the service 106*a* to access the secrets 112*a* but do not allow the service 106*b* or the service 106*c* to access the secrets 112*a*. Further assume that the cache service 108*a* stores copies of the secrets 112*a*, 112*b*, 112*c* on the memory 118*a*. The cache service 108*a* may, based on the access controls, grant a request from the service 106*a* to access the secrets 112*a* but deny a request from the service 106*b* to access the secrets 112*a*.

The cache service 108*b* provides the services 106*d*, 106*e*, 106*f*, 106*g* access to secrets. The cache service 108*b* may reside in a service container separate from the containers 104*d*, 104*e*, 104*f*, 104*g*. The services 106*d*, 106*e*, 106*f*, 106*g* may be closer to the cache service 108*b* than to the absolute stores 110*a*, 110*b*, 110*c*.

The cache service 108*b* has access to copies of secrets that the services 106*d*, 106*e*, 106*f*, 106*g* need to access. For example, the cache service 108*b* has access to copies of the secrets 112*a*, 112*b*, 112*c*. The services 106*d*, 106*e*, 106*f*, 106*g* are closer to the copies of the secrets 112*a*, 112*b*, 112*c* than to the absolute stores 110*a*, 110*b*, 110*c*. The cache service 108*b* may store copies of individual secrets or versions of individual secrets with logical or physical isolation. In this way, the cache service 108*b* may provide access to individual secrets or individual versions of individual secrets. The cache service 108*b* may apply different access controls to different individual secrets.

The copies of the secrets 112*a*, 112*b*, 112*c* may be stored in memory 118*b*. The memory 118*b* is within the service container in which the cache service 108*b* resides. The copies of the secrets 112*a*, 112*b*, 112*c* may be stored in memory 120*b*. The memory 120*b* is memory in the cluster 102*b* but may be outside the service container in which the cache service 108*b* resides. The copies of the secrets 112*a*, 112*b*, 112*c* may be stored in memory 116. The memory 116 is memory in the cloud-computing system 100 but outside the cluster 102*b*. The cluster 102*b* may be closer to the memory 116 than to the absolute stores 110*a*, 110*b*, 110*c*.

The copies of the secrets 112*a*, 112*b*, 112*c* may be stored in two or more locations among the memory 118*b*, the memory 120*b*, and the memory 116. For example, the memory 118*b* may serve as a layer one cache layer (a hot cache that would provide fast access) and the memory 120*b* or the memory 116 may serve as a layer two cache layer (for warm-up or disaster recovery).

The cache service 108*b* may store copies of individual secrets or versions of individual secrets with logical or physical isolation. The cache service 108*b* applies access controls to the copies of the secrets 112*a*, 112*b*, 112*c*. The cache service 108*b* may apply access controls to the copies of the secrets 112*a* identical to the access controls that the absolute store 110*a* applies to the secrets 112*a*. The cache service 108*b* may apply access controls to the copies of the secrets 112*b* identical to the access controls that the absolute store 110*b* applies to the secrets 112*b*. The cache service 108*b* may apply access controls to the copies of the secrets 112*c* identical to the access controls that the absolute store 110*c* applies to the secrets 112*c*.

The cache service 108*b* receives requests for access to secrets. The cache service 108*b* receives requests for access to secrets from containers in the cluster 102*b* where the cache service 108*b* resides. For example, the cache service 108*b* may receive requests to access the secrets 112*a*, 112*b*, 112*c* from the containers 104*d*, 104*e*, 104*f*, 104*g*. A request may identify one or more specific secrets and include an artifact for authentication. The artifact may include information about a requesting service. The cache service 108*b* may determine whether to grant the request based on the one or more specific secrets identified in the request, the artifact included in the request, and a set of access controls applicable to the one or more specific secrets. If the cache service 108*b* grants the request, the cache service 108*b* may provide the requesting service the one or more specific secrets. The cache service 108*b* may retrieve the one or more specific secrets from the memory 118*b*, the memory 120*b*, or the memory 116.

The access controls of the cache service 108*b* protect secrets of a first entity from being accessed by a second entity. For example, assume access controls applicable to the secrets 112*a* allow the service 106*d* and the service 106*e* to access the secrets 112*a* but do not allow the service 106*f* or the service 106*g* to access the secrets 112*a*. Further assume that the cache service 108*b* stores copies of the secrets 112*a*, 112*b*, 112*c* on the memory 118*b*. The cache service 108*b*, based on the access controls, grants requests from the services 106*d*, 106*e* to access the secrets 112*a* but deny a request from the service 106*g* to access the secrets 112*a*.

Figure 1B:
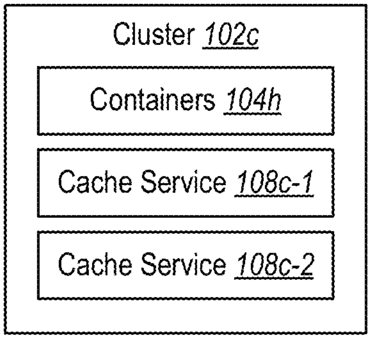
FIG. 1B illustrates a cluster-level cache service that has scaled up to meet demand.

FIG. 1B illustrates a cluster 102*c* in which a cache service operates as a cluster-level service and scales up as traffic increases. The cluster 102*c* includes containers 104*h* and cache service 108*c*-1. The containers 104*h* includes multiple containers. Each of the containers 104*h* houses an application or an instance of an application. The cache service 108*c*-1 provides the containers 104*h* access to secrets. The cluster 102*c* increases or reduce a number of the containers 104*h* based on demand for services of applications running in the containers 104*h*. As demand for services of the application grows, the cluster 102*c* increases the number of the containers 104*h*. As the cluster 102*c* increases the number of the containers 104*h*, demand on the cache service 108*c*-1 increases. In order to meet that demand, the cluster 102*c* increases a number of instances of the cache service 108*c*-1. For example, the cluster 102*c* replicates the cache service 108*c*-1 to generate cache service 108*c*-2. The cache service 108*c*-2 provides the containers 104*h* access to the secrets. The cache service 108*c*-2 runs in a first container separate from a second container in which the cache service 108*c*-1 runs. The cache service 108*c*-1 and the cache service 108*c*-2 communicate in order to maintain consistency in responding to requests. Although FIG. 1B illustrates two instances of a cache service, a cluster may include any number of instances of a cache service based on demand for the cache service.

Figure 2:
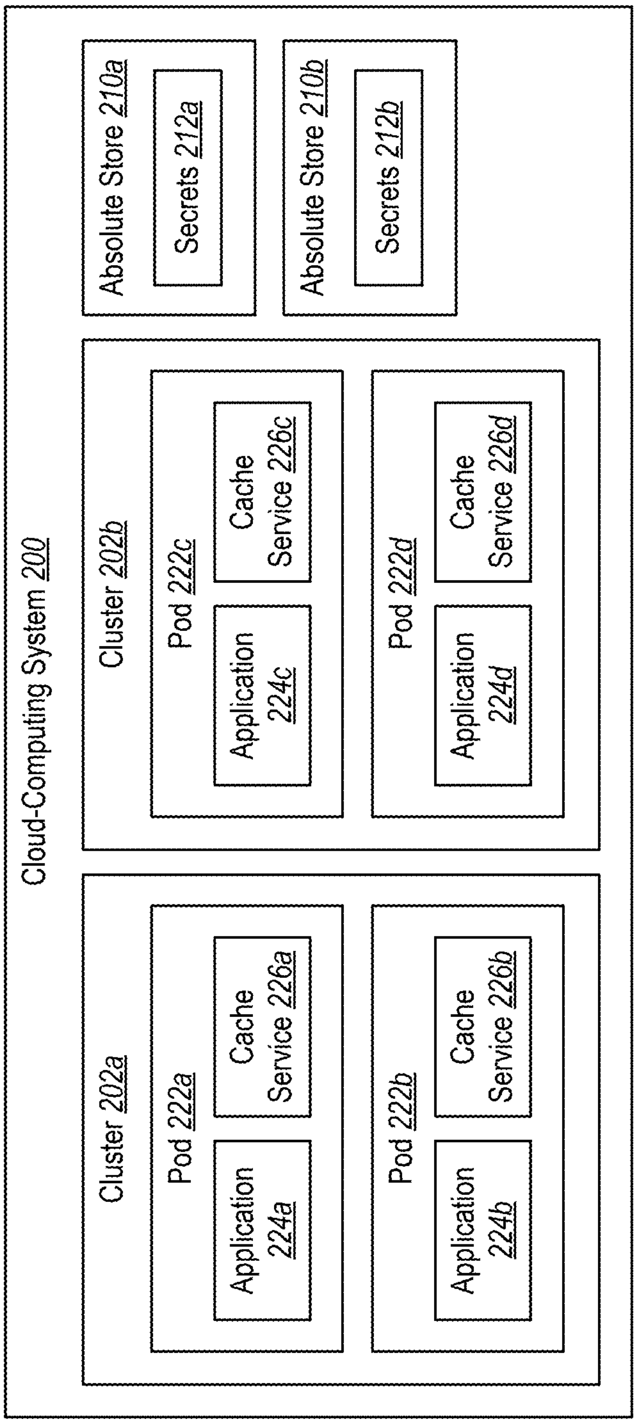
FIG. 2 illustrates a cloud-computing system in which a cache service for providing access to secrets operates as a sidecar service.

FIG. 2 illustrates an example cloud-computing system 200 in which a cache service operates in a sidecar model. The cloud-computing system 200 includes an absolute store 210*a*, an absolute store 210*b*, a cluster 202*a*, and a cluster 202*b*.

The absolute store 210*a* may have any of the characteristics or features of the absolute store 110*a*. The absolute store 210*a* includes secrets 212*a*. The secrets 212*a* may have any of the characteristics or features of the secrets 112*a*.

The absolute store 210*b* may have any of the characteristics or features of the absolute store 110*b*. The absolute store 210*b* includes secrets 212*b*. The secrets 212*b* may have any of the characteristics or features of the secrets 112*b*.

The cluster 202*a* may have any of the characteristics or features of the cluster 102*a*. The cluster 202*a* includes pod 222*a* and pod 222*b*. A pod is a smallest deployable unit of computing that can be created and managed in a containerized computing environment. A pod may be a container. A pod may be a group of one or more containers. The pod may include a specification for how to run the one or more containers. The one or more containers may share resources (such as storage and network resources) and dependencies. The one or more containers may communicate with each other and coordinate when and how they are terminated. Contents of a pod are co-located and co-scheduled on a same physical or virtual machine in a cluster. When a pod includes a single container, the pod may be a wrapper around the single container. When a pod includes two or more containers, the two or more containers may form a single cohesive unit of service. The pod may wrap the two or more containers, storage resources, and an ephemeral network identity together as a single unit. Each pod may be intended to run a single instance of a given application. Scaling an application horizontally may result in an additional pod for each additional application instance.

The pod 222*a* includes application 224*a* and cache service 226*a*. The application 224*a* may run in a container, and the cache service 226*a* may run in a separate sidecar container. The application 224*a* and the cache service 226*a* may be co-located in a same physical machine or virtual machine. The application 224*a* needs access to the secrets 212*a*. The secrets 212*a* are associated with the application 224*a*. Without the cache service 226*a*, the application 224*a* may request secrets from the absolute store 210*a*. The absolute store 210*a* has a physical location different from the cluster 202*a*. A distance between the pod 222*a* and the absolute store 210*a* results in a delay between the application 224*a* sending a call for a secret and the application 224*a* receiving the secret from the absolute store 210*a*.

As demand for the application 224*a* increases, the cluster 202*a* generates additional instances of the application 224*a*. To do so the cluster 202*a* generates additional pods and each additional pod includes an additional instance of the application 224*a*. Each additional pod may also include an additional instance of the cache service 226*a* to provide services to the additional instance of the application 224*a* running in the same additional pod.

The cache service 226*a* provides the application 224*a* access to copies of the secrets 212*a* at reduced latency. The cache service 226*a* stores copies of the secrets 212*a* in memory within the pod 222*a*, memory within the cluster 202*a*, or memory outside the cluster 202*a* that is closer to the pod 222*a* than the absolute store 210*a* is to the pod 222*a*. The cache service 226*a* applies access controls to the copies of the secrets 212*a*. The cache service 226*a* may apply access controls to the copies of the secrets 212*a* identical to access controls that the absolute store 210*a* applies to the secrets 212*a*. The cache service 226*a* may not have access to the secrets 212*b*. The cache service 226*a* may not provide access to the secrets 212*b*.

The application 224*a* sends a call for a secret to the cache service 226*a*. The cache service 226*a* determines, based on the call and the access controls, whether the application 224*a* is authorized to access the secret. If the cache service 226*a* determines that the application 224*a* is authorized to access the secret, the cache service 226*a* provides a copy of the secret to the application 224*a*. If the cache service 226*a* determines that the application 224*a* is not authorize to access the secret, the cache service 226*a* rejects the call.

The pod 222*b* includes application 224*b* and cache service 226*b*. The application 224*b* may run in a container, and the cache service 226*b* may run in a separate sidecar container. The application 224*b* and the cache service 226*b* may be co-located in a same physical machine or virtual machine. The application 224*b* needs access to the secrets 212*b*. The secrets 212*b* are associated with the application 224*b*. The application 224*b* is different from the application 224*a*. The application 224*b* and the application 224*a* may be associated with different tenants. Without the cache service 226*b*, the application 224*b* may request secrets from the absolute store 210*b*. The absolute store 210*b* has a physical location different from the cluster 202*a*. A distance between the pod 222*b* and the absolute store 210*b* results in a delay between the application 224*b* sending a call for a secret and the application 224*b* receiving the secret from the absolute store 210*b*.

The cache service 226*b* provides the application 224*b* access to copies of the secrets 212*b* at reduced latency. The cache service 226*b* stores copies of the secrets 212*b* in memory within the pod 222*b*, memory within the cluster 202*a*, or memory outside the cluster 202*a* that is closer to the pod 222*b* than the absolute store 210*b* is to the pod 222*b*. The cache service 226*b* applies access controls to the copies of the secrets 212*b*. The cache service 226*b* may apply access controls to the copies of the secrets 212*b* identical to access controls that the absolute store 210*b* applies to the secrets 212*b*. The cache service 226*b* may not have access to the secrets 212*a*. The cache service 226*b* may not provide access to the secrets 212*a*.

The application 224*b* sends a call for a secret to the cache service 226*b*. The cache service 226*b* determines, based on the call and the access controls, whether the application 224*b* is authorized to access the secret. If the cache service 226*b* determines that the application 224*b* is authorized to access the secret, the cache service 226*b* provides a copy of the secret to the application 224*b*. If the cache service 226*b* determines that the application 224*b* is not authorized to access the secret, the cache service 226*b* rejects the call.

The cluster 202*b* may have any of the characteristics or features of the cluster 102*b*. The cluster 202*b* includes pod 222*c* and pod 222*d*.

The pod 222*c* includes application 224*c* and cache service 226*c*. The application 224*c* may run in a container, and the cache service 226*c* may run in a separate sidecar container. The application 224*c* and the cache service 226*c* may be co-located in a same physical machine or virtual machine. The application 224*c* needs access to the secrets 212*a*. The application 224*c* is a second instance of the application 224*a*. Without the cache service 226*c*, the application 224*c* may request secrets from the absolute store 210*a*. The absolute store 210*a* has a physical location different from the cluster 202*b*. A distance between the pod 222*c* and the absolute store 210*a* results in a delay between the application 224*c* sending a call for a secret and the application 224*c* receiving the secret from the absolute store 210*a*.

The cache service 226*c* provides the application 224*c* access to copies of the secrets 212*a* at reduced latency. The cache service 226*c* stores copies of the secrets 212*a* in memory within the pod 222*c*, memory within the cluster 202*b*, or memory outside the cluster 202*b* that is closer to the pod 222*c* than the absolute store 210*a* is to the pod 222*c*. The cache service 226*c* applies access controls to the copies of the secrets 212*a*. The cache service 226*c* may apply access controls to the copies of the secrets 212*a* identical to access controls that the absolute store 210*a* applies to the secrets 212*a*. The cache service 226*c* may not have access to the secrets 212*b*. The cache service 226*c* may not provide access to the secrets 212*b*.

The application 224*c* sends a call for a secret to the cache service 226*c*. The cache service 226*c* determines, based on the call and the access controls, whether the application 224*c* is authorized to access the secret. If the cache service 226*c* determines that the application 224*c* is authorized to access the secret, the cache service 226*c* provides a copy of the secret to the application 224*c*.

The pod 222*d* includes application 224*d* and cache service 226*d*. The application 224*d* may run in a container, and the cache service 226*d* may run in a separate sidecar container. The application 224*d* and the cache service 226*d* may be co-located in a same physical machine or virtual machine. The application 224*d* needs access to the secrets 212*a*. The application 224*d* is a third instance of the application 224*a*. Without the cache service 226*d*, the application 224*d* may request secrets from the absolute store 210*a*.

The cache service 226*d* provides the application 224*d* access to copies of the secrets 212*a* at reduced latency. The cache service 226*d* stores copies of the secrets 212*a* in memory within the pod 222*d*, memory within the cluster 202*b*, or memory outside the cluster 202*b* that is closer to the pod 222*d* than the absolute store 210*a* is to the pod 222*d*. The cache service 226*d* applies access controls to the copies of the secrets 212*a*. The cache service 226*d* may apply access controls to the copies of the secrets 212*a* identical to access controls that the absolute store 210*a* applies to the secrets 212*a*. The cache service 226*d* may not have access to the secrets 212*b*. The cache service 226*d* may not provide access to the secrets 212*b*.

The application 224*d* sends a call for a secret to the cache service 226*d*. The cache service 226*d* determines, based on the call and the access controls, whether the application 224*d* is authorized to access the secret. If the cache service 226*d* determines that the application 224*d* is authorized to access the secret, the cache service 226*d* provides a copy of the secret to the application 224*d*.

Figure 3:
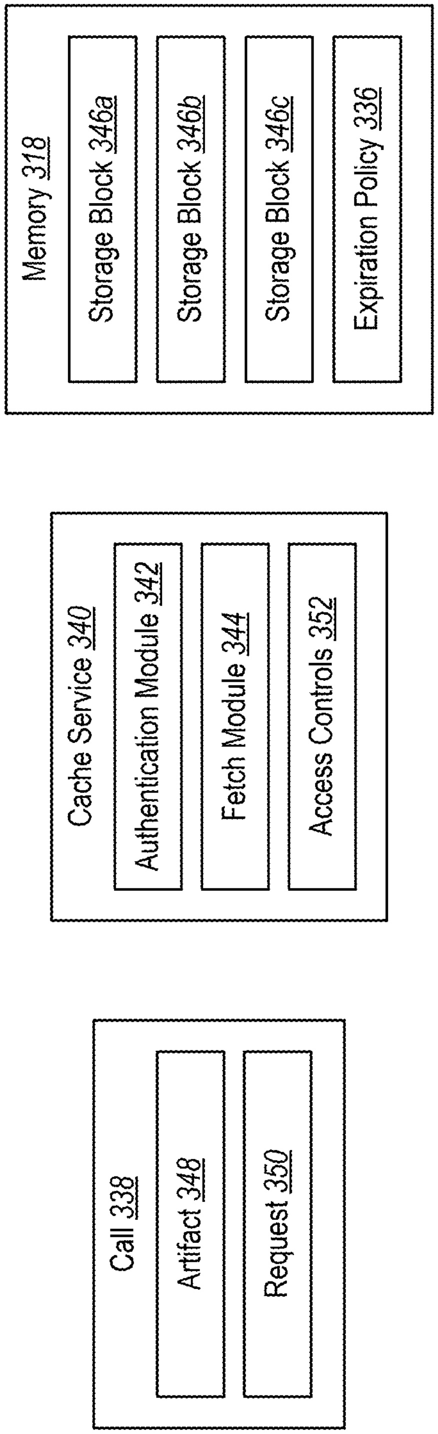
FIG. 3 illustrates an example cache service that provides access to secrets in response to a call.

FIG. 3 illustrates an example cache service 340, call 338, and memory 318.

The call 338 is a request from a service, application, or container (a requesting entity) for one or more secrets. The requesting entity may be associated with a specific tenant or a specific identity of a tenant. The requesting entity sends the call 338 to the cache service 340. The requesting entity may authenticate the cache service 340 before sending the call 338 to the cache service 340.

The call 338 includes an artifact 348 and a request 350. The request 350 identifies one or more specific secrets requested by the requesting entity. The artifact 348 includes one or more objects for authenticating the call 338. For example, the artifact 348 may include one or more tokens, certificates, signatures, or credentials. The requesting entity may receive the artifact 348 or one or more elements of the artifact 348 from an identity provider of a cloud-computing system. The artifact 348 may include one or more claims. The claims may include information regarding the requesting entity. For example, the claims may identify the requesting entity, a tenant with which the requesting entity is associated, and/or an identity with which the requesting entity is associated.

The cache service 340 includes an authentication module 342, a fetch module 344, and access controls 352. The cache service 340 has access to memory 318. The memory 318 may be container memory, cluster memory, or off-cluster memory.

The memory 318 includes one or more secrets. The one or more secrets stored in the memory 318 are copies of one or more secrets stored in one or more absolute stores. The one or more secrets may be associated with one or more entities (such as one or more services or applications of a tenant, one or more identities of a tenant, or one or more tenants). Access to the one or more secrets stored in the memory 318 is restricted. Authorization to access the one or more secrets is based on the access controls 352.

The memory 318 stores the one or more secrets in such a way that each individual secret (and even each individual version of each individual secret) may be separately accessed. The memory 318 stores the one or more secrets in such a way that the cache service 340 can determine whether a requesting entity is authorized to access any particular individual secret (and even any particular individual version of a secret). The memory 318 stores the one or more secrets in such a way that the cache service 340 can apply different access controls to each individual secret (and even each individual version of a secret).

The memory 318 includes a storage block 346*a*, a storage block 346*b*, and a storage block 346*c*. Each of the storage blocks 346*a*, 346*b*, 346*c* stores a separate secret or version of a secret. For example, the storage block 346*a* may store a first secret, the storage block 346*b* may store a second secret, and the storage block 346*c* may store a third secret. The cache service 340 may apply a first set of access controls within the access controls 352 to the first secret stored in the storage block 346*a*, a second set of access controls within the access controls 352 to the second secret stored in the storage block 346*b*, and a third set of access controls within the access controls 352 to the third secret stored in the storage block 346*c*. The first set of access controls may be different from the second set of access controls and the third set of access controls. The second set of access controls may be different from the third set of access controls. For example, one or more entities authorized to access the first secret under the first set of access controls may be different from one or more entities authorized to access the second secret under the second set of access controls.

The first secret, the second secret, and the third secret may each be associated with a same entity or two or more different entities. For example, the first secret, the second secret, and the third secret may all be associated with a single tenant and a same identity of the single tenant. In the alternative, the first secret, the second secret, and the third secret may all be associated with a single tenant but different identities of the single tenant. In the alternative, the first secret, the second secret, and the third secret may all be associated with a single tenant but different services of the single tenant. In the alternative, the first secret, the second secret, and the third secret may be associated with different tenants.

The cache service 340 aggregates secrets from two or more absolute stores in the memory 318. In other words, the cache service 340 may store copies of secrets from two or more absolute stores in the memory 318 and provide access to the copies of the secrets from the two or more absolute stores. The cache service 340 may apply access controls to the copies of the secrets from the two or more absolute stores identical to the access controls applied by the two or more absolute stores to the secrets.

The cache service 340 aggregates secrets for two or more entities in the memory 318. For example, the cache service 340 may aggregate secrets for two or more tenants, two or more identities of a tenant, and/or two or more services of a tenant in the memory 318.

The cache service 340 provides for isolation per entity. The cache service 340 stores secrets in the memory 318 in such a way that the cache service 340 can distinguish between and separately control access to secrets of different entities. The cache service 340 isolates secrets of one entity from secrets of a second entity. Isolating first secrets of a first entity from second secrets of a second entity may mean that the cache service 340 can grant the first entity access to the first secrets and deny the first entity access to the second secrets. For example, the cache service 340 may isolate secrets of a first tenant from secrets of a second tenant. In that case, the cache service 340 may receive calls from services of both the first tenant and the second tenant and allow the first tenant to access secrets of the first tenant while denying the second tenant access to the secrets of the first tenant. As another example, the cache service 340 may isolate secrets of a first identity of a first tenant from secrets of a second identity of the first tenant. As another example, the cache service 340 may isolate secrets of a first service of a first identity of a first tenant from secrets of a second service of the first identity of the first tenant.

The cache service 340 applies granulated access controls. The cache service 340 may apply different sets of access controls to different individual secrets. The cache service 340 may receive requests for individual secrets and may determine whether to grant or deny the requests based on access controls applicable to the individual secrets. For example, the cache service 340 may receive a first request from a first entity and a second request from the first entity. The first request may seek access to a first secret, and the second request may seek access to a second secret. The cache service 340 may apply a first set of access controls to the first request based on the first request seeking access to the first secret and apply a second set of access controls to the second request based on the second request seeking access to the second secret. The first set of access controls may authorize the first entity to access the first secret. The second set of access controls may not authorize the first entity to access the second secret. The cache service 340 may grant the first request based on the first set of access controls but deny the second request based on the second set of access controls.

The memory 318 includes an expiration policy 336. The expiration policy 336 specifies a lifetime of the memory 318. Each separately accessible portion of the memory 318 may have a different lifetime. For example, the storage block 346*a* may have a first lifetime and the storage block 346*b* may have a second lifetime different from the first lifetime. The expiration policy 336 may require that the cache service 340 repopulate contents of the memory 318 when the contents of the memory 318 have expired (e.g., an amount of time since the contents of the memory 318 were populated exceeds the lifetime of the memory 318). For example, assume that the first secret stored in the storage block 346*a* has a first lifetime. Assume that the first lifetime has expired. If the cache service 340 receives a request for access to the first secret, the expiration policy 336 may require that the cache service 340 repopulate the storage block 346*a* before providing access to contents of the storage block 346*a*. The cache service 340 may repopulate the storage block 346*a* by fetching information from an absolute store that contains the first secret. The expiration policy 336, including lifetimes of the memory 318, may be based on one or more security policies of one or more absolute stores. The memory 318 may include copies of secrets stored on the one or more absolute stores.

The fetch module 344 retrieves information for storing in the memory 318. The fetch module 344 may retrieve copies of secrets from one or more absolute stores or from one or more L2 cache storages. The fetch module 344 may retrieve information during initiation or warm-up of the cache service 340 and the memory 318. The fetch module 344 may retrieve information when information stored in the memory 318 has expired based on the expiration policy 336.

The authentication module 342 authenticates requests for access to secrets. The authentication module 342 may receive the call 338. The authentication module 342 determines whether the requesting entity identified in the call 338 is authorized to access the one or more specific secrets identified in the request 350. The authentication module 342 determines whether the requesting entity is authorized to access the one or more specific secrets based on the artifact 348 and the access controls 352. The authentication module 342 validates the artifact 348. The authentication module 342 may make a validation call to the cloud-computing system to validate the artifact 348. The authentication module 342 authenticates the one or more claims in the artifact 348 based on the access controls 352. The authentication module 342 denies a request if the authentication module 342 cannot validate the artifact 348 or authenticate the one or more claims in the artifact 348. The authentication module 342 denies the request if the authentication module 342 determines that the requesting entity is not authorized to access the one or more specific secrets based on the access controls 352. The access controls 352 may include one or more sets of access controls. A different set of access controls may apply to each individual secret stored in the memory 318.

Figure 4:
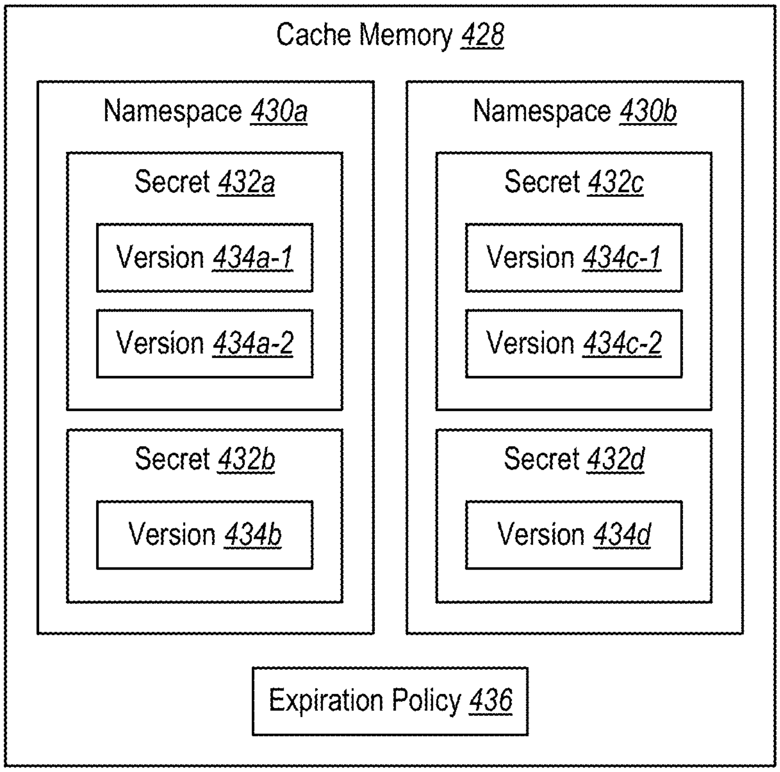
FIG. 4 illustrates an example cache memory for storing secrets provided by a cache service.

FIG. 4 illustrates an example cache memory 428.

The cache memory 428 stores copies of information that is stored in a separate store. For example, the cache memory 428 may store copies of secrets stored in an absolute store that has a location different from a location of the cache memory 428 and is physically and logically distinct from the absolute store.

The cache memory 428 stores copies of secrets such that there can be isolation between individual secrets and granulated access controls applied to individual secrets. The cache memory 428 stores copies of secrets such that a first version of a first secret can be isolated from a second version of the first secret; a first secret can be isolated from a second secret; first secrets associated with a first application can be isolated from second secrets of a second application (even where the first application and the second application are both associated with a same tenant or a same identity of a tenant); first secrets associated with a first tenant can be isolated from second secrets of a second tenant; and first secrets of a first user can be isolated from second secrets of a second user (even where the first user and the second user are both associated with a same tenant). A first secret may be isolated from a second secret when the first secret can be accessed separately from the second secret. A first secret may be isolated from a second secret when access to the first secret can be controlled independently from access to the second secret. A first secret may be isolated from a second secret when a cache service can apply a set of access controls to the first secret that is different from a set of access controls applied to the second secret.

One way the cache memory 428 may be organized in order to provide isolation and granulated access control is through namespaces. A namespace may uniquely identify an entity such as an application or service, a group of applications or services, a tenant, a group of tenants, a user, or a group of users. Namespaces may allow the cache memory 428 to isolate information associated with a first entity from information associated with a second entity. For example, namespaces may allow the cache memory 428 to isolate information associated with a first tenant from information associated with a second tenant; information associated with a first application of a first tenant from information associated with a second application of the first tenant; information associated with a first application of a first tenant from information associated with a second application of the first tenant; and information associated with a first user of a tenant from information associated with a second user of the tenant.

By way of example, the cache memory 428 includes information associated with namespace 430*a* and namespace 430*b*. The namespace 430*a* and the namespace 430*b* may be associated with a same tenant. In the alternative, the namespace 430*a* and the namespace 430*b* may be associated with different tenants.

The namespace 430*a* includes secret 432*a* and secret 432*b*. The secret 432*a* and the secret 432*b* may both be associated with the namespace 430*a*. For example, the namespace 430*a* may be a particular application of a first tenant and the secrets 432*a*, 432*b* may be both associated with the particular application of the first tenant. As another example, the namespace 430*a* may be a particular identity of a first tenant and the secrets 432*a*, 432*b* may be both associated with the particular identity of the first tenant. The secret 432*a* may include version 434*a*-1 and version 434*a*-2. The versions 434*a*-1, 434*a*-2 may be different versions of the secret 432*a*. The cache memory 428 may allow each of the versions 434*a*-1, 434*a*-2 to be separately access. The cache memory 428 may allow different access controls to be applied to each of the versions 434*a*-1, 434*a*-2. The cache memory 428 may include information identifying which of the version 434*a*-1 and the version 434*a*-2 is a current version of the secret 432*a*. The secret 432*b* may include version 434*b*.

The namespace 430*b* includes secret 432*c* and secret 432*d*. The namespace 430*b* may be different from the namespace 430*a*. For example, the namespace 430*a* may be a first application and the namespace 430*b* may be a second application different from the first application. As another example, the namespace 430*a* may be a first application that is associated with a first identity of a first tenant and the namespace 430*b* may be the first application but associated with a second identity of the first tenant. The secret 432*c* may include version 434*c*-1 and version 434*c*-2. The secrets 432*c*, 432*d* may be associated with the namespace 430*b*. The secret 432*d* may include version 434*d*.

Figure 5:
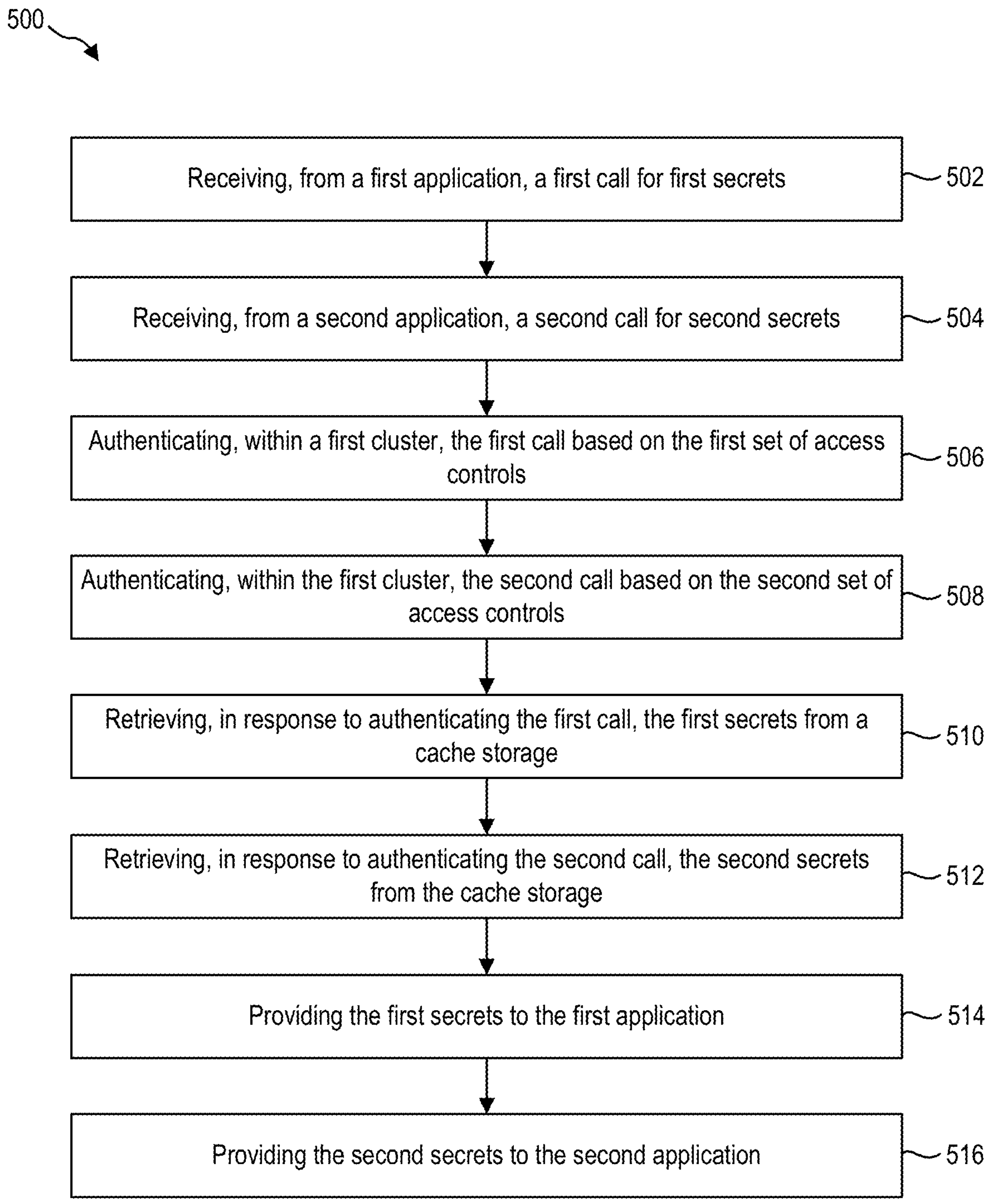
FIG. 5 illustrates a method for providing low-latency access to secrets in a multi-tenant, cloud-computing system.

FIG. 5 illustrates a method 500 for providing low-latency access to secrets in a multi-tenant, cloud-computing system.

The method 500 includes receiving 502, from a first application, a first call for first secrets. A first absolute store contains the first secrets and enforces a first set of access controls on the first secrets. The first application runs on a first cluster of a cloud-computing system.

The first call identifies the first application and contains information regarding the first application. The first call includes a first artifact. The first application runs inside a first container. A cache service receives the first call for the first secrets. The cache service may run inside a service container separate from the first container.

The method 500 includes receiving 504, from a second application, a second call for second secrets. A second absolute store separate from the first absolute store contains the second secrets and enforces a second set of access controls on the second secrets. The first set of access controls authorizes the first application but not the second application to access the first secrets. The second set of access controls authorizes the second application but not the first application to access the second secrets. The second application runs on the first cluster. The first absolute store and the second absolute store are located outside the first cluster in the cloud-computing system.

The second call identifies the second application and contains information regarding the second application. The second call includes a second artifact. The second application may run inside a second container separate from the first container. The cache service receives the second call.

The first application may be associated with a first tenant, and the second application may be associated with a second tenant different from the first tenant. In the alternative, the first application may be associated with a first identity of the first tenant, and the second application may be associated with a second identity of the first tenant. In the alternative, the first application and the second application may be both associated with a same tenant or a same identity.

The method 500 includes authenticating 506, within a first cluster, the first call based on the first set of access controls. Authenticating 506 the first call may be further based on validating the first artifact. The cache service authenticates the first call.

The method 500 includes authenticating 508, within the first cluster, the second call based on the second set of access controls. Authenticating 508 the second call may be further based on validating the second artifact. The cache service authenticates the second call.

The method 500 includes retrieving 510, in response to authenticating the first call, the first secrets from a cache storage. The first application is more proximate to the cache storage than to the first absolute store. The cache storage contains copies of the first secrets. The cache service retrieves the first secrets.

The method 500 includes retrieving 512, in response to authenticating the second call, the second secrets from the cache storage. The second application is more proximate to the cache storage than to the second absolute store. The cache storage contains copies of the second secrets. The cache service retrieves the second secrets. The cache storage may reside in memory of a container. In the alternative, the cache storage may reside in memory of the first cluster. In the alternative, the cache storage may reside outside the first cluster. The cache storage may include a cache expiration policy that determines when entries in the cache storage expire. The cache expiration policy may be based on the first set of access controls and the second set of access controls.

The method 500 includes providing 514 the first secrets to the first application. The cache service provides the first secrets.

The method 500 includes providing 516 the second secrets to the second application. The cache service provides the second secrets.

Figure 6:
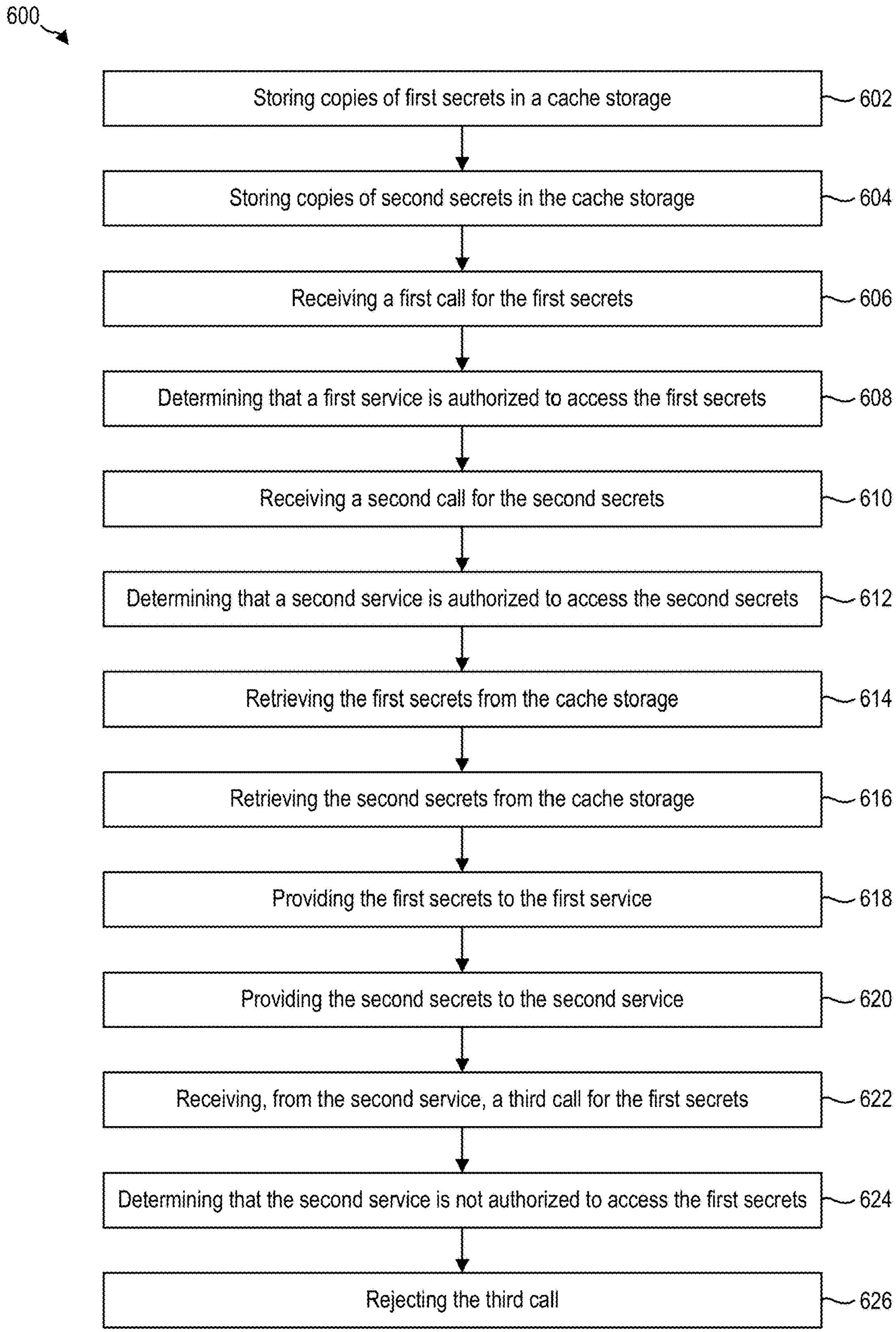
FIG. 6 illustrates a method for caching secrets from multiple entities.

FIG. 6 illustrates a method 600 for caching secrets from multiple entities.

The method 600 includes storing 602 copies of first secrets in a cache storage. The cache storage is part of a cloud-computing system, the first secrets are also stored at a first location different from the cache storage, and a first set of access controls authorizes a first entity to access the first secrets but not a second entity. A cache service stores the copies of the first secrets in the cache storage.

The method 600 includes storing 604 copies of second secrets in the cache storage. The second secrets are different from the first secrets, the second secrets are also stored in a second location different from the cache storage, and a second set of access controls authorizes the second entity to access the second secrets but not the first entity.

The method 600 includes receiving 606 a first call for the first secrets. The cache service receives the first call within a first cluster of the cloud-computing system. A first service associated with the first entity sends the first call. The first service is running in a first container in the first cluster. The first container is closer to the cache storage than to the first location. The cache storage may be in the first cluster. The cache service may be running in a service container in the first cluster. The cache storage may be located in the service container.

The method 600 includes determining 608 that a first service is authorized to access the first secrets. Determining 608 that the first service is authorized to access the first secrets is based on the first call and the first set of access controls. The cache service determines that the first service is authorized to access the first secrets.

The method 600 includes receiving 610 a second call for the second secrets. The cache service receives the second call within the first cluster. The cache service receives the second call from a second service associated with the second entity. The second service is running in a second container in the first cluster. The second container is closer to the cache storage than to the second location.

The method 600 includes determining 612 that a second service is authorized to access the second secrets. Determining 612 that the second service is authorized to access the second secrets is based on the second call and the second set of access controls. The cache service determines that the second service is authorized to access the second secrets.

The method 600 includes retrieving 614 the first secrets from the cache storage. Retrieving 614 the first secrets from the cache storage is based on determining that the first service is authorized to access the first secrets. The cache service retrieves the first secrets.

The method 600 includes retrieving 616 the second secrets from the cache storage. Retrieving 616 the second secrets from the cache storage is based on determining that the second service is authorized to access the second secrets. The cache service retrieves the second secrets.

The method 600 includes providing 618 the first secrets to the first service. The cache service provides the first secrets to the first service.

The method 600 includes providing 620 the second secrets to the second service. The cache service provides the second secrets to the second service.

The method 600 includes receiving 622, from the second service, a third call for the first secrets. The cache service receives the third call.

The method 600 includes determining 624 that the second service is not authorized to access the first secrets. Determining 624 that the second service is not authorized to access the first secrets is based on the third call and the first set of access controls. The cache service determines that the second service is not authorized to access the first secrets.

The method 600 includes rejecting 626 the third call. The cache service rejects the third call.

Figure 7:
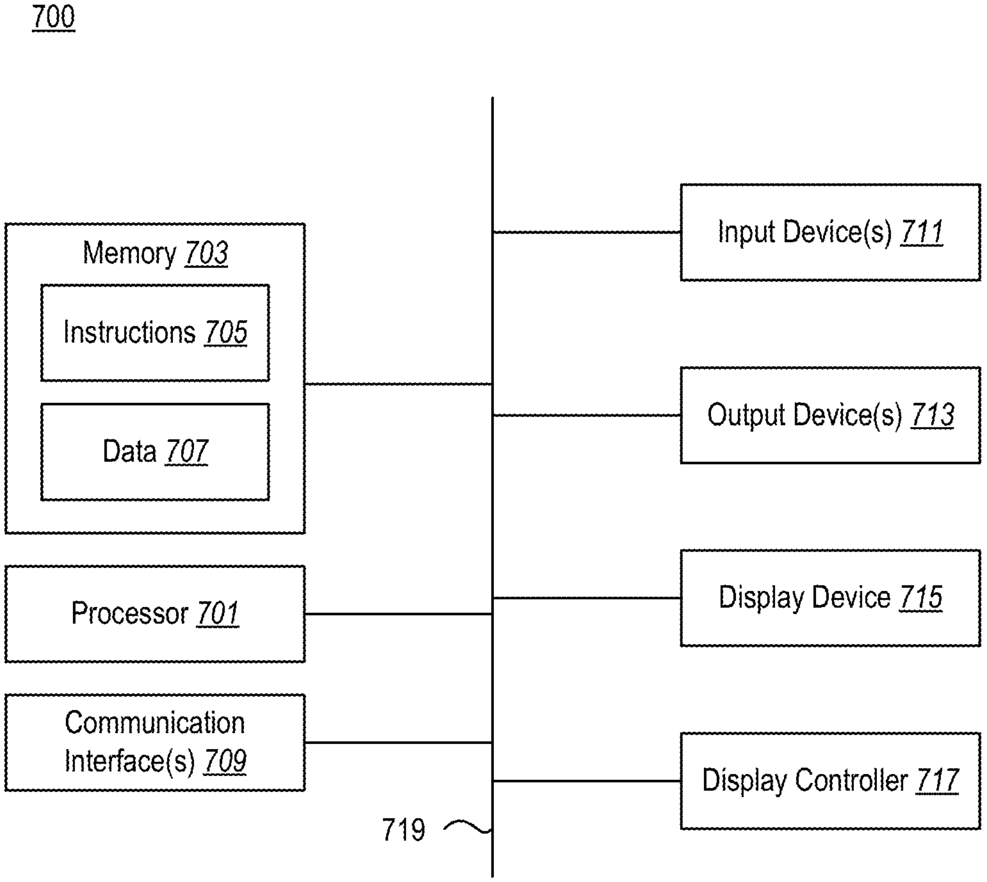
FIG. 7 illustrates certain components that can be included within a computing device.

Reference is now made to FIG. 7. One or more computing devices 700 can be used to implement at least some aspects of the techniques disclosed herein. FIG. 7 illustrates certain components that can be included within a computing device 700.

The computing device 700 includes a processor 701 and memory 703 in electronic communication with the processor 701. Instructions 705 and data 707 can be stored in the memory 703. The instructions 705 can be executable by the processor 701 to implement some or all of the methods, steps, operations, actions, or other functionality that is disclosed herein. Executing the instructions 705 can involve the use of the data 707 that is stored in the memory 703. Unless otherwise specified, any of the various examples of modules and components described herein can be implemented, partially or wholly, as instructions 705 stored in memory 703 and executed by the processor 701. Any of the various examples of data described herein can be among the data 707 that is stored in memory 703 and used during execution of the instructions 705 by the processor 701.

Although just a single processor 701 is shown in the computing device 700 of FIG. 7, in an alternative configuration, a combination of processors (e.g., an Advanced RISC (Reduced Instruction Set Computer) Machine (ARM) and a digital signal processor (DSP)) could be used.

The computing device 700 can also include one or more communication interfaces 709 for communicating with other electronic devices. The communication interface(s) 709 can be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The computing device 700 can also include one or more input devices 711 and one or more output devices 713. Some examples of input devices 711 include a keyboard, mouse, microphone, remote control device, button, joystick, trackball, touchpad, and lightpen. One specific type of output device 713 that is typically included in a computing device 700 is a display device 715. Display devices 715 used with embodiments disclosed herein can utilize any suitable image projection technology, such as liquid crystal display (LCD), light-emitting diode (LED), gas plasma, electroluminescence, wearable display, or the like. A display controller 717 can also be provided, for converting data 707 stored in the memory 703 into text, graphics, and/or moving images (as appropriate) shown on the display device 715. The computing device 700 can also include other types of output devices 713, such as a speaker, a printer, etc.

The various components of the computing device 700 can be coupled together by one or more buses, which can include a power bus, a control signal bus, a status signal bus, a data bus, etc. For the sake of clarity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A cloud-computing system, the cloud-computing system comprising:

a first absolute store containing first secrets associated with a first service, wherein the first absolute store enforces a first set of access controls on the first secrets and wherein the first set of access controls authorize the first service to access the first secrets;

a first cache storage containing copies of the first secrets for performing warm-up operations or disaster recovery; and a first cluster of two or more servers, the first cluster comprising:

a first container comprising the first service;

a second cache storage; and a first cache service, wherein the first cache service comprises instructions stored in the first cache storage or the second cache storage that, when executed by a processor of the first cluster, cause the first cache service to:

receive a request to perform a warm-up operation for the first service;

retrieve, from the first cache storage, copies of the first secrets and the first set of access controls for the first service;

save the copies of the first secrets and the first set of access controls to the second cache storage;

receive, from the first service, a first call for the first secrets;

authenticate the first call based on the first set of access controls from the second cache storage; and retrieve, in response to authenticating the first call, the first secrets from the second cache storage.

2. The system of claim 1, wherein the instructions further comprise:

receive a request to perform a warm-up operation for a second instance of the first service;

retrieve, from the second cache storage, second copies of the first secrets and the first set of access controls to warm-up the second instance of the first service;

receive, from the second instance of the first service, a second call for the first secrets;

authenticate the second call from the second instance of the first service based on the second copies of the first set of access controls from the second cache storage; and retrieve, in response to authenticating the second call, the second copies of the first secrets from the second cache storage.

3. The system of claim 1, further comprising:

a second cluster of two or more servers, the second cluster comprising:

a second cluster container comprising a second cluster instance of the first service;

a second cluster cache storage containing copies of the first secrets and the second secrets; and a second cluster cache service, wherein the second cluster cache service comprises instructions stored in the first cache storage or the second cluster cache storage that, when executed by a processor of the second cluster, cause the second cluster cache service to:

receive a request to perform a warm-up operation for the second cluster instance of the first service;

retrieve, from the first cache storage or the second cache storage, second copies of the first secrets and the first set of access controls for the second cluster instance of the first service;

save the second copies of the first secrets and the first set of access controls to the second cluster cache storage;

receive, from the second cluster instance of the first service, a second call for the first secrets;

authenticate the second call based on the second copies of the first set of access controls from the second cluster cache storage; and retrieve, in response to authenticating the second call, the second copies of the first secrets from the second cluster cache storage, wherein the second cluster container is closer to the second cluster cache storage than to the first cache storage.

4. The system of claim 3, wherein the first cluster instance of first service and the second cluster instance of the first service are associated with a fleet.

5. The system of claim 1, wherein the first cache service further comprises a cache expiration policy based on the first set of access controls.

6. The system of claim 5, wherein the instructions further comprises:

determine that the copies of the first secrets and the first set of access controls in the second cache storage are expired;

fetch second copies of the first secrets and the first set of access controls from the first cache storage; and save the second copies of the first secrets and the first set of access controls from the first cache storage to the second cache storage.

7. The system of claim 5, wherein the instructions further comprises:

determine that the copies of the first secrets and the first set of access controls in the second cache storage are expired;

fetch second copies of the first secrets and the first set of access controls from the first absolute storage; and save the second copies of the first secrets and the first set of access controls from the first absolute storage to the first cache storage and to the second cache storage.

8. The system of claim 1, further comprising:

a second absolute store containing second secrets associated with a second service, wherein the second absolute store enforces a second set of access controls on the second secrets, wherein the second absolute store is separate from the first absolute store, and wherein the second set of access controls authorize the second service to access the second secrets but do not authorize the first service to access the second secrets;

wherein the first cache storage contains copies of the second secrets and the second set of access controls;

wherein the first cluster comprises a second container comprising the second service; and wherein the instructions further include:

receive a request to perform a warm-up operation for the second service;

retrieve, from the first cache storage, copies of the second secrets and the second set of access controls for the second service;

save the copies of the second secrets and the second set of access controls to the second cache storage;

receive, from the second service, a second call for the second secrets;

authenticate the second call based on the second set of access controls from the second cache storage; and retrieve, in response to authenticating the second call, the second secrets from the second cache storage, wherein the second container is closer to the second cache storage than to the first cache storage and closer to the first cache storage than to the second absolute store.

9. The system of claim 8, wherein the first cache storage and the second cache storage save and isolate the first secrets and the first set of access controls in a first namespace from the second secrets and the second set of access controls in a second namespace, wherein the first namespace includes a unique identifier of a first tenant of the first absolute store and the second namespace includes a unique identifier of a second tenant of the second absolute store.

10. The system of claim 9, wherein the first namespace includes a first version of the first secrets for a particular identity of the first tenant and a second version of the first secrets for a second particular identity of the first tenant, wherein the first version and the second version is accessed separately.

11. The system of claim 10, wherein the first version and the second version have different access controls.

12. The system of claim 1, wherein the first container is closer to the second cache storage than to the first cache storage and wherein the first container is closer to the first cache storage than the first absolute store.

13. A cloud-computing system, the cloud-computing system comprising:

a first absolute store having a geographic location and containing first secrets, wherein the first absolute store enforces a first set of access controls on the first secrets and the first set of access controls authorize a first service to access the first secrets;

a first cluster of two or more nodes having a first cluster geographic location, the first cluster comprising a first cache storage containing copies of the first secrets and the first set of access controls;

a second cluster of two or more nodes having a second cluster geographic location and a second cache storage, the second cluster comprising:

a second container comprising:

a second instance of the first service; and a second cache service, wherein the second cache service comprises second instructions stored in memory that, when executed by one or more processors, cause the second cache service to:

receive a request to warm-up the second instance of the first service;

retrieve, from the first cache storage, copies of the first secrets and the first set of access controls;

save copies of the first secrets and the first set of access controls in the second cache storage;

receive, from the second instance of the first service, a first call for the first secrets;

authenticate the first call based on the first set of access controls; and retrieve, in response to authenticating the first call, the first secrets from the second cache storage, wherein the second container is closer to the first cache storage than to the first absolute store.

14. The system of claim 13 further comprising:

a second absolute store containing second secrets, wherein the second absolute store enforces a second set of access controls on the second secrets, wherein the second absolute store is separate from the first absolute store, and wherein the second set of access controls authorize a second service to access the second secrets but do not authorize the first service to access the second secrets, wherein the first cache storage further contains copies of the second secrets and the second set of access controls, and wherein the second cluster further comprises a third container, the third container comprising:

a first instance of the second service; and a third cache service, wherein the third cache service comprises second instructions stored in memory that, when executed by one or more processors, cause the third cache service to:

receive a request to warm-up the first instance of the second service;

retrieve, from the first cache storage, copies of the second secrets and the second set of access controls;

save copies of the second secrets and the second set of access controls in the second cache storage;

receive, from the first instance of the second service, a second call for the second secrets;

authenticate the second call based on the second set of access controls; and retrieve, in response to authenticating the second call, the second secrets from the second cache storage.

15. The system of claim 13, wherein the first secrets comprise one or more passwords.

16. The system of claim 13, the first cache service further comprises a first cache expiration policy wherein the first cache expiration policy is based on a lifetime of the memory of the second cache storage.

17. The system of claim 13, wherein the first cache service further comprises a first cache expiration policy and the second cache service further comprises a second cache expiration policy, wherein the first cache expiration policy and the second cache expiration policy are based on a security policy of the first absolute store.

18. The system of claim 17, wherein the first instructions further include:

determine that the copies of the first secrets and the first set of access controls in the second cache storage have expired;

fetch copies of the first secrets and the first set of access controls from the first cache storage; and save the copies of the first secrets and the first set of access controls in the second cache storage.

19. A non-transitory computer-readable medium comprising instructions that are executable by one or more processors to cause a computing system to:

receive a request to perform a warm-up operation for a first instance of a first service;

retrieve, from a cache storage, copies of first secrets and a first set of access controls for the first instance of the first service;

save the copies of the first secrets and the first set of access controls to a first hot cache storage;

receive, from the first instance of the first service, a first call for the first secrets;

authenticate the first call based on the first set of access controls from the first hot cache storage; and retrieve, in response to authenticating the first call, the first secrets from the first hot cache storage, wherein the first instance of the first service is closer to the first hot cache storage than to the cache storage.

20. The instructions of claim 19, further comprising:

receive a request to perform a warm-up operation for a second instance of the first service;

determine that the copies of the first secrets and the first set of access controls in the first hot cache storage are expired;

fetch copies of the first secrets and the first set of access controls from the cache storage;

save the copies of the first secrets and the first set of access controls from the cache storage to the first hot cache storage;

receive, from the second instance of the first service, a second call for the first secrets;

authenticate the second call from the second instance of the first service based on the copies of the first set of access controls from the first hot cache storage; and retrieve, in response to authenticating the second call, the copies of the first secrets from the first hot cache storage, wherein the second instance of the first service is closer to the first hot cache storage than to the cache storage.

21. The instructions of claim 19, further comprising:
receive a request to perform a warm-up operation for a second instance of the first service;
retrieve, from the cache storage, a second set of copies of the first secrets and the first set of access controls for the first service;
save the second set of copies of the first secrets and the first set of access controls for the first service to a second hot cache storage;
receive, from the second instance of the first service, a second call for the first secrets;
authenticate the second call based on the first set of access controls from the second hot cache storage; and
retrieve, in response to authenticating the second call, the first secrets from the second hot cache storage, wherein the second instance of the first service is closer to the second hot cache storage than to the cache storage and the first hot cache storage.

* * * * *